United States Patent
Yang et al.

(10) Patent No.: US 12,082,138 B2
(45) Date of Patent: Sep. 3, 2024

(54) PROPOSAL, RELATING TO TRANSMISSION TIMING ERROR, FOR V2X SIDELINK COMMUNICATION

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR); Jongkeun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 418 days.

(21) Appl. No.: 17/593,520

(22) PCT Filed: Mar. 25, 2020

(86) PCT No.: PCT/KR2020/004028
§ 371 (c)(1),
(2) Date: Sep. 20, 2021

(87) PCT Pub. No.: WO2020/204442
PCT Pub. Date: Oct. 8, 2020

(65) Prior Publication Data
US 2022/0150857 A1    May 12, 2022

(30) Foreign Application Priority Data

Apr. 5, 2019   (KR) .......................... 10-2019-0040364
Apr. 5, 2019   (KR) .......................... 10-2019-0040365

(51) Int. Cl.
*H04W 56/00*   (2009.01)
*H04L 5/00*    (2006.01)
*H04W 4/40*    (2018.01)

(52) U.S. Cl.
CPC ....... *H04W 56/0015* (2013.01); *H04L 5/0092* (2013.01); *H04W 4/40* (2018.02)

(58) Field of Classification Search
CPC ..... H04W 56/0015; H04W 4/40; H04W 4/46; H04W 56/00; H04W 56/004; H04W 56/0005; H04L 5/0092
See application file for complete search history.

(56) References Cited

U.S. PATENT DOCUMENTS

2019/0020431 A1*  1/2019  Chae ................. H04W 56/0005
2019/0045483 A1*  2/2019  Tabet ................... H04W 72/30
(Continued)

FOREIGN PATENT DOCUMENTS

WO    2018060980    4/2018
WO    2019036578    2/2019

OTHER PUBLICATIONS

3GPP TS 38.133 V15.3.0 3rd Generation Partnership Project; Technical Specification Group Radio Access Network; "5G; NR; Requirements for support of radio resource management" (Oct. 2018) (Year: 2018).*

(Continued)

*Primary Examiner* — Wutchung Chu
(74) *Attorney, Agent, or Firm* — LEE, HONG, DEGERMAN, KANG & WAIMEY

(57) ABSTRACT

A disclosure of the present specification provides a method for V2X sidelink communication, which is performed by a vehicle to everything (V2X) device. The method may comprise the steps of: performing synchronization for V2X sidelink transmission on the basis of a synchronization reference user equipment (SyncRefUE); and performing V2X sidelink transmission on the basis of the synchronization. For the V2X sidelink transmission, a transmission timing error (Te) may have a value smaller than or equal to a first value. The first value may be predetermined on the (Continued)

basis of a subcarrier spacing (SCS) of a sidelink signal, and the subcarrier spacing (SCS) may include 15 kHz, 30 kHz, and 60 kHz.

15 Claims, 15 Drawing Sheets

(56) References Cited

U.S. PATENT DOCUMENTS

| | | | |
|---|---|---|---|
| 2019/0098589 A1* | 3/2019 | Chae | H04W 56/001 |
| 2019/0289561 A1* | 9/2019 | Corley | H04W 24/02 |
| 2020/0008183 A1* | 1/2020 | Chen | H04W 72/20 |
| 2020/0053683 A1* | 2/2020 | Gulati | H04W 56/0045 |
| 2020/0053768 A1* | 2/2020 | Chen | H04W 72/1263 |
| 2020/0120625 A1* | 4/2020 | Park | H04W 56/001 |
| 2020/0146082 A1* | 5/2020 | Chen | H04W 72/21 |
| 2020/0187190 A1* | 6/2020 | Gao | H04W 56/001 |
| 2021/0176097 A1* | 6/2021 | Zheng | H04W 72/30 |
| 2021/0176720 A1* | 6/2021 | Chae | H04W 92/18 |
| 2021/0258121 A1* | 8/2021 | Liu | H04L 27/26025 |
| 2021/0360520 A1* | 11/2021 | Chen | H04W 76/11 |
| 2022/0053442 A1* | 2/2022 | Luo | H04W 74/0833 |
| 2022/0095278 A1* | 3/2022 | Kim | H04L 5/00 |
| 2022/0132460 A1* | 4/2022 | Shimoda | G01S 5/021 |
| 2022/0200675 A1* | 6/2022 | Raghavan | H04B 7/0695 |

OTHER PUBLICATIONS

PCT International Application No. PCT/KR2020/004028, International Search Report dated Jul. 2, 2020, 4 pages.

Intel Corporation, "On NR V2X RRM Characteristics," R4-1902990, 3GPP TSG-RAN WG4 Meeting #90bis, Apr. 2019, 8 pages.

Qualcomm Incorporated, "Synchronization Design for NR V2X," R1-1905010, 3GPP TSG RAN WG1 Meeting #96bis, Apr. 2019, 14 pages.

Qualcomm Incorporated, "Considerations on Physical Layer aspects of NR V2X," R1-1900884, 3GPP TSG RAN WG1 Ad-Hoc Meeting 1901, Jan. 2019, 17 pages.

* cited by examiner

PROPOSAL, RELATING TO TRANSMISSION TIMING ERROR, FOR V2X SIDELINK COMMUNICATION

CROSS-REFERENCE TO RELATED APPLICATIONS

This application is the National Stage filing under 35 U.S.C. 371 of International Application No. PCT/KR2020/004028, filed on Mar. 25, 2020, which claims the benefit of earlier filing date and right of priority to Korean Application Nos. 10-2019-0040365, filed on Apr. 5, 2019, and 10-2019-0040364, filed on Apr. 5, 2019, the contents of which are all hereby incorporated by reference herein in their entireties.

TECHNICAL FIELD

The present specification relates to mobile communications.

BACKGROUND

With the success of long term evolution (LTE)/LTE-Advanced (LTE-A) for the fourth-generation mobile communication, the next generation mobile communication, which is the fifth-generation (so called 5G) mobile communication, has been attracting attentions and more and more researches are being conducted.

For the 5G mobile communication, new radio access technology (new RAT or NR) has been researched.

The fifth-generation communication defined by the international telecommunication union (ITU) refers to providing a maximum data transmission speed of 20 Gbps and a maximum transmission speed of 100 Mbps per user in anywhere. It is officially called "IMT-2020" and aims to be released around the world in 2020.

Meanwhile, LTE/LTE-A technology and NR technology may also be used for vehicle communication. This is called vehicle-to-everything (V2X). Communication technology through all interfaces with the vehicle is commonly called V2X.

Communication between V2X devices without going through a base station is called V2X communication, and a link used for communication between V2X devices is also called a sidelink.

In order to ensure performance for V2X transmission on the NR-based sidelink, a transmit timing error needs to be technically defined. That is, when performing transmission on the NR-based sidelink for V2X communication, a minimum timing error ($T_e$) must be defined to ensure performance.

However, there is a problem that V2X communication performance cannot be guaranteed because research on this has not been conducted so far.

SUMMARY

Therefore, the disclosure of the present specification is to propose method for solving the above-mentioned problems.

In order to solve the above-mentioned problems, One disclosure of the present specification provides a method for a vehicle to everything (V2X) sidelink communication, the method performed by a V2X device and comprising: performing a synchronization for a V2X sidelink transmission based on a synchronization reference user equipment (SyncRefUE); and performing the V2X sidelink transmission based on the synchronization, wherein for the V2X sidelink transmission, a transmission timing error (Te) is to be less than or equal to a first value, wherein the first value is predetermined based on a subcarrier spacing (SCS) of a sidelink signal which includes 15 kHz, 30 kHz and 60 kHz.

In order to solve the above-mentioned problems, one disclosure of the present specification provides a V2X (vehicle to everything) device for V2X sidelink, the user equipment comprising: at least one processor; and at least one memory for storing instructions and operably electrically connectable with the at least one processor, based on the instructions being operated by the at least one processor, performed operation comprising: performing a synchronization for a V2X sidelink transmission based on a synchronization reference user equipment (SyncRefUE); and performing the V2X sidelink transmission based on the synchronization, wherein for the V2X sidelink transmission, a transmission timing error (Te) is to be less than or equal to a first value, wherein the first value is predetermined based on a subcarrier spacing (SCS) of a sidelink signal which includes 15 kHz, 30 kHz and 60 kHz.

In order to solve the above-mentioned problems, one disclosure of the present specification provides a processor equipped in a V2X (vehicle to everything) device for V2X sidelink communication comprising: first circuit for performing synchronization for V2X sidelink transmission, based on a synchronization reference user equipment (SyncRefUE); and second circuit for performing V2X sidelink transmission, based on the synchronization; wherein for the V2X sidelink transmission, a transmission timing error (Te) is to be less than or equal to a first value, wherein the first value is predetermined based on a subcarrier spacing (SCS) of a sidelink signal which includes 15 kHz, 30 kHz and 60 kHz.

In order to solve the above-mentioned problems, one disclosure of the present specification provides a non-volatile computer readable storage medium having recorded instructions, wherein the instructions, based on being executed by one or more processors, cause the one or more processors to: perform a synchronization for a V2X sidelink transmission based on a synchronization reference user equipment (SyncRefUE); and perform the V2X sidelink transmission based on the synchronization, wherein for the V2X sidelink transmission, a transmission timing error (Te) is to be less than or equal to a first value, wherein the first value is predetermined based on a subcarrier spacing (SCS) of a sidelink signal which includes 15 kHz, 30 kHz and 60 kHz.

Wherein based on that the SCS of the sidelink signal is 15 kHz, the first value is a value obtained from 12*64*Tc, and Wherein based on that the SCS of the sidelink signal is 30 kHz, the first value is a value obtained from 8*64*Tc, and Wherein based on that the SCS of the sidelink signal is 60 kHz, the first value is a value obtained from 5*64*Tc.

According to the disclosure of the present specification, it is possible to solve the problems of the prior art.

DETAILED DESCRIPTION

Figure 1:
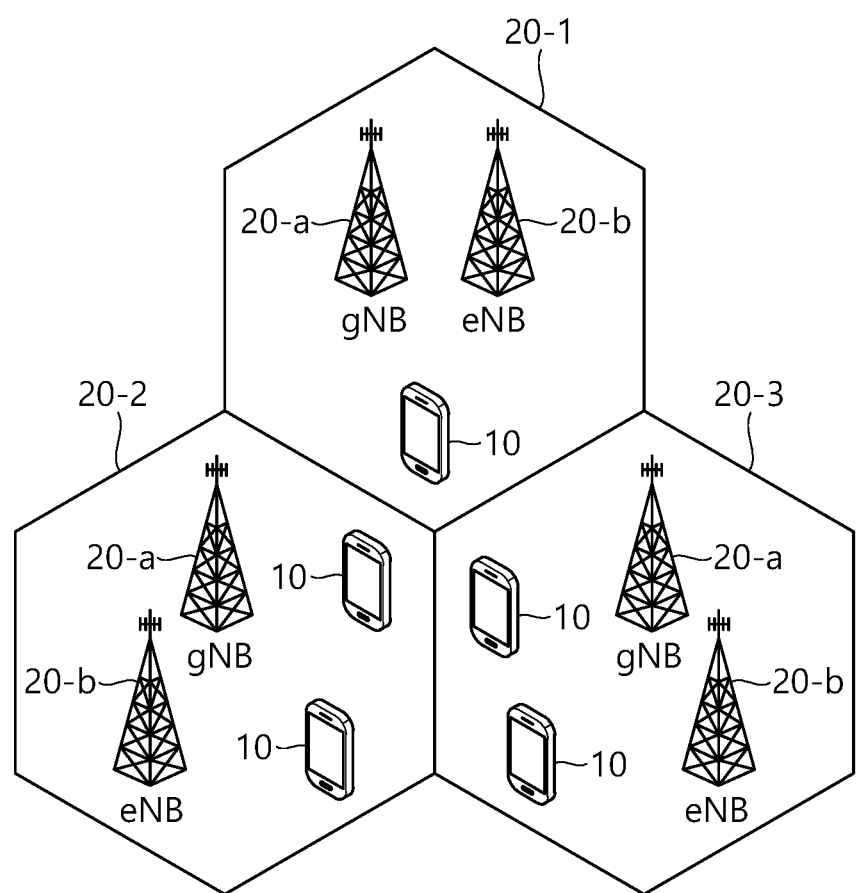
FIG. 1 is a wireless communication system.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

In addition, the expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

In addition, the terms 'first' and 'second' in the present specification are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are individually described in one drawing in the present specification may be implemented individually or may be implemented at the same time.

In the appended drawings, although a User Equipment (UE) is illustrated as an example, this is merely an example given to simplify the description of the present disclosure. Herein, a UE may mean to a wireless communication device performing communication in a communication system, such as EPS and/or 5GS, and so on. And, the UE shown in the drawing may also be referred to as a terminal, a mobile equipment (ME), a wireless communication device, a wireless communication apparatus, and so on. Additionally, the UE may be a portable device, such as a laptop computer, a mobile phone, a PDA, a smart phone, a multimedia device, and so on, or the UE may be a non-portable device, such as a personal computer (PC) or a vehicle mounted device.

Hereinafter, the UE is used as an example of a device capable of wireless communication (eg, a wireless communication device, a wireless device, or a wireless device). The operation performed by the UE may be performed by any device capable of wireless communication. A device capable of wireless communication may also be referred to as a wireless communication device, a wireless device, or a wireless device.

A base station, a term used below, generally refers to a fixed station that communicates with a wireless device, which may be called other terms such as an evolved-NodeB (eNodeB), an evolved-NodeB (eNB), a BTS (Base Transceiver System), an access point (Access Point), gNB (Next generation NodeB).

FIG. 1 is a wireless communication system.

As can be seen with reference to FIG. 1, a wireless communication system includes at least one base station (BS). The BS is divided into a gNodeB (or gNB) 20a and an eNodeB (or eNB) 20b. The gNB 20a supports 5G mobile communication. The eNB 20b supports 4G mobile communication, that is, long term evolution (LTE).

Each base station 20a and 20b provides a communication service for a specific geographic area (commonly referred to as a cell) (20-1, 20-2, 20-3). A cell may in turn be divided into a plurality of regions (referred to as sectors).

A UE typically belongs to one cell, and the cell to which the UE belongs is called a serving cell. A base station providing a communication service to a serving cell is referred to as a serving base station (serving BS). Since the wireless communication system is a cellular system, other cells adjacent to the serving cell exist. The other cell adjacent to the serving cell is referred to as a neighbor cell. A base station that provides a communication service to a neighboring cell is referred to as a neighbor BS. The serving cell and the neighboring cell are relatively determined based on the UE.

Hereinafter, downlink means communication from the base station (20) to the UE (10), and uplink means communication from the UE (10) to the base station (20). In the downlink, the transmitter may be a part of the base station (20), and the receiver may be a part of the UE (10). In the uplink, the transmitter may be a part of the UE (10), and the receiver may be a part of the base station (20).

Meanwhile, a wireless communication system may be largely divided into a frequency division duplex (FDD) scheme and a time division duplex (TDD) scheme. According to the FDD scheme, uplink transmission and downlink transmission are performed while occupying different frequency bands. According to the TDD scheme, uplink transmission and downlink transmission are performed at different times while occupying the same frequency band. The channel response of the TDD scheme is substantially reciprocal. This means that the downlink channel response and the uplink channel response are almost the same in a given frequency domain. Accordingly, in the TDD-based wireless communication system, there is an advantage that the downlink channel response can be obtained from the uplink channel response. In the TDD scheme, since uplink transmission and downlink transmission are time-divided in the entire frequency band, downlink transmission by the base station and uplink transmission by the UE cannot be simultaneously performed. In a TDD system in which uplink transmission and downlink transmission are divided in subframe units, uplink transmission and downlink transmission are performed in different subframes.

Hereinafter, the LTE system will be described in more detail.

Figure 2:
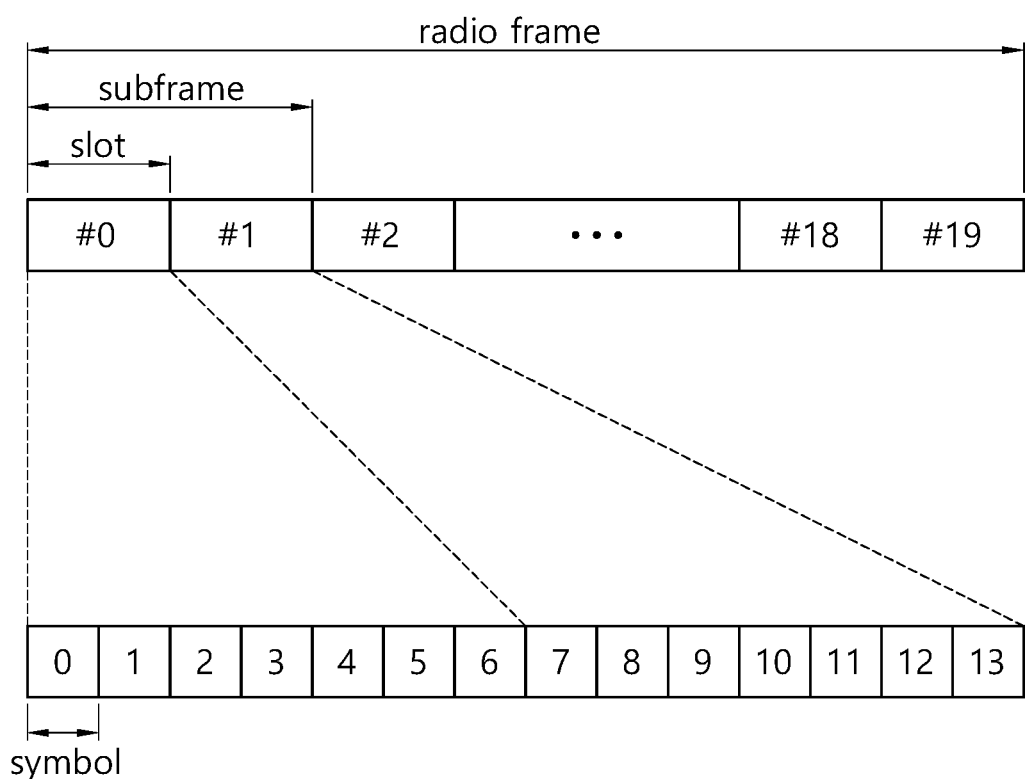
FIG. 2 shows the structure of a radio frame according to FDD in 3GPP LTE.

FIG. 2 shows the structure of a radio frame according to FDD in 3GPP LTE.

Referring to FIG. 2, a radio frame includes 10 subframes, and one subframe includes two slots. The slots in the radio frame are numbered from 0 to 19. The time it takes for one subframe to be transmitted is referred to as a transmission time interval (TTI). The TTI may be referred to as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame or the number of slots included in the subframe may be variously changed.

Meanwhile, one slot may include a plurality of orthogonal frequency division multiplexing (OFDM) symbols. How many OFDM symbols are included in one slot may vary according to a cyclic prefix (CP).

One slot includes NRB resource blocks (RBs) in a frequency domain. For example, in the LTE system, the number of resource blocks (RBs), that is, NRB may be any one of 6 to 110.

A resource block (RB) is a resource allocation unit and includes a plurality of subcarriers in one slot. For example, if one slot includes 7 OFDM symbols in the time domain and the resource block includes 12 subcarriers in the frequency domain, one resource block may include 7*12 resource elements (REs).

In 3GPP LTE, physical channels are divided into data channels, such as PDSCH (Physical Downlink Shared Channel) and PUSCH (Physical Uplink Shared Channel), and control channels, such as PDCCH (Physical Downlink Control Channel), PCFICH (Physical Control Format Indicator Channel), PHICH (Physical Hybrid-ARQ Indicator Channel) and PUCCH (Physical Uplink Control Channel).

The uplink channel includes PUSCH, PUCCH, SRS (Sounding Reference Signal), and PRACH (Physical Random Access Channel).

<Next-Generation Mobile Communication Network>

Thanks to the success of LTE (long term evolution)/LTE-Advanced (LTE-A) for 4th generation mobile communication, interest in next-generation, that is, 5th generation (so-called 5G) mobile communication is increasing, and research is being conducted one after another.

5G mobile communication, defined by the International Telecommunication Union (ITU), refers to providing a data transmission rate of up to 20 Gbps and a perceived transmission speed of at least 100 Mbps anywhere. The official name is 'IMT-2020', and it aims to commercialize it worldwide in 2020.

The ITU proposes three usage scenarios, for example, eMBB (enhanced Mobile BroadBand), mMTC (massive Machine Type Communication) and URLLC (Ultra Reliable and Low Latency Communications).

URLLC relates to usage scenarios that require high reliability and low latency. For example, services such as autonomous driving, factory automation, and augmented reality require high reliability and low latency (eg, latency of 1 ms or less). Currently, the delay time of 4G (LTE) is statistically 21-43 ms (best 10%) and 33-75 ms (median). This is insufficient to support services requiring latency of less than 1 ms. Next, the eMBB usage scenario relates to a usage scenario requiring mobile ultra-wideband.

That is, the 5th generation mobile communication system may target higher capacity than the current 4G LTE, increase the density of mobile broadband users, and support D2D (Device to Device), high stability, and MTC (Machine type communication). 5G R&D also aims to achieve lower latency and lower battery consumption than 4G mobile communication systems to better realize the Internet of Things. For such 5G mobile communication, a new radio access technology (New RAT or NR) may be proposed.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 3A:
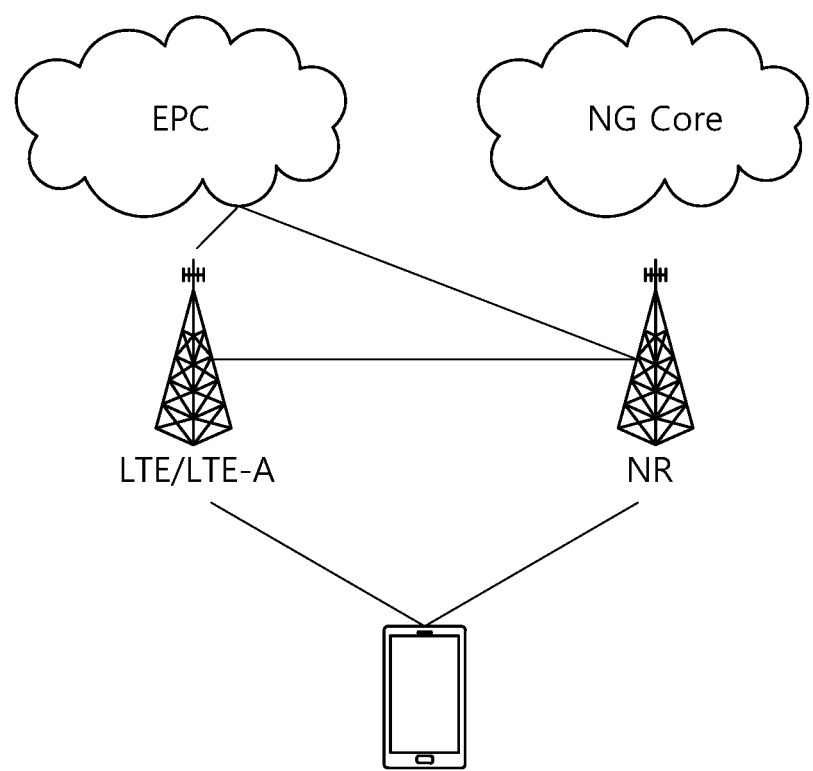
FIGS. 3a to 3c are exemplary diagrams illustrating an exemplary architecture for a service of next-generation mobile communication.
Figure 3B:
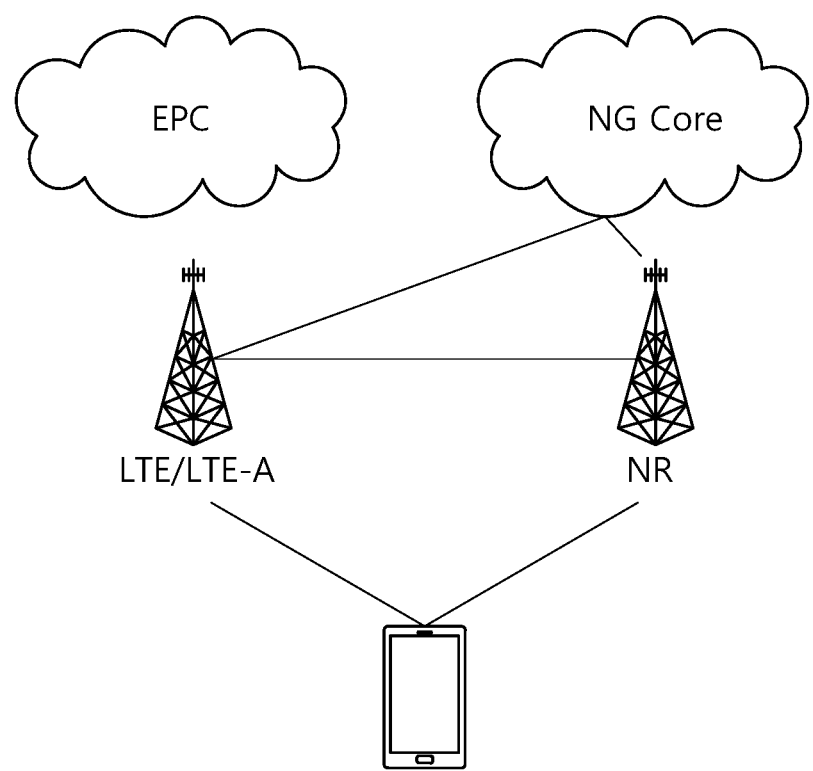
Figure 3C:
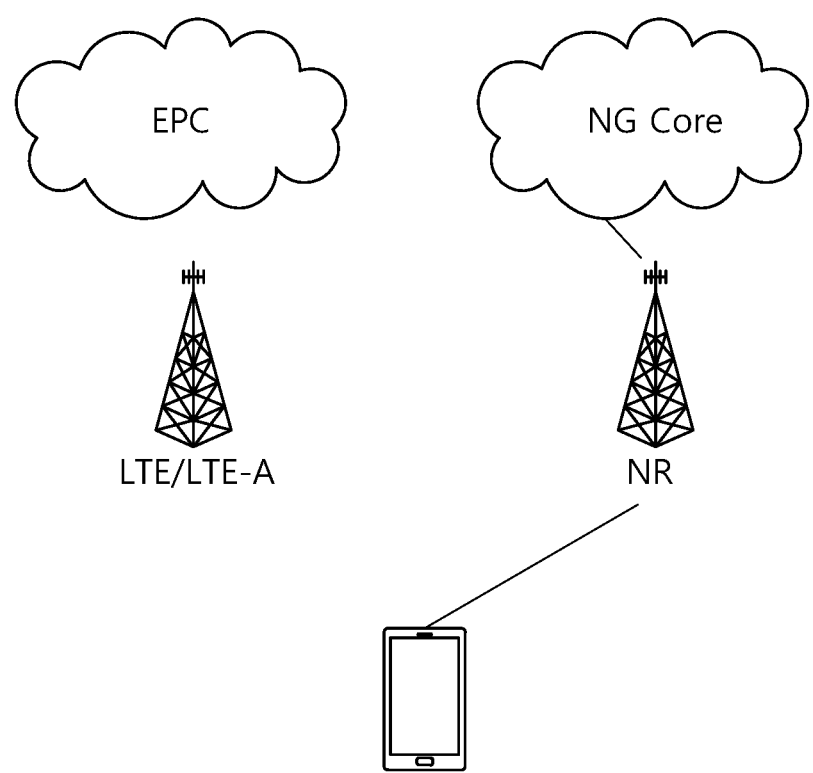

FIGS. 3a to 3c are exemplary diagrams illustrating an exemplary architecture for a service of next-generation mobile communication.

Referring to FIG. 3a, the UE is connected to the LTE/LTE-A-based cell and the NR-based cell in a DC (dual connectivity) manner.

The NR-based cell is connected to a core network for the existing 4G mobile communication, that is, the NR-based cell is connected an Evolved Packet Core (EPC).

Referring to FIG. 3b, unlike FIG. 3a, an LTE/LTE-A-based cell is connected to a core network for 5G mobile communication, that is, the LTE/LTE-A-based cell is connected to a Next Generation (NG) core network.

A service method based on the architecture shown in FIG. 3a and FIG. 3b is referred to as NSA (non-standalone).

Referring to FIG. 3c, UE is connected only to an NR-based cell. A service method based on this architecture is called SA (standalone).

Meanwhile, in the NR, it may be considered that reception from a base station uses downlink subframe, and transmission to a base station uses uplink subframe. This method can be applied to paired and unpaired spectra. A pair of spectrum means that two carrier spectrums are included for downlink and uplink operation. For example, in a pair of spectrums, one carrier may include a downlink band and an uplink band that are paired with each other.

Figure 4:
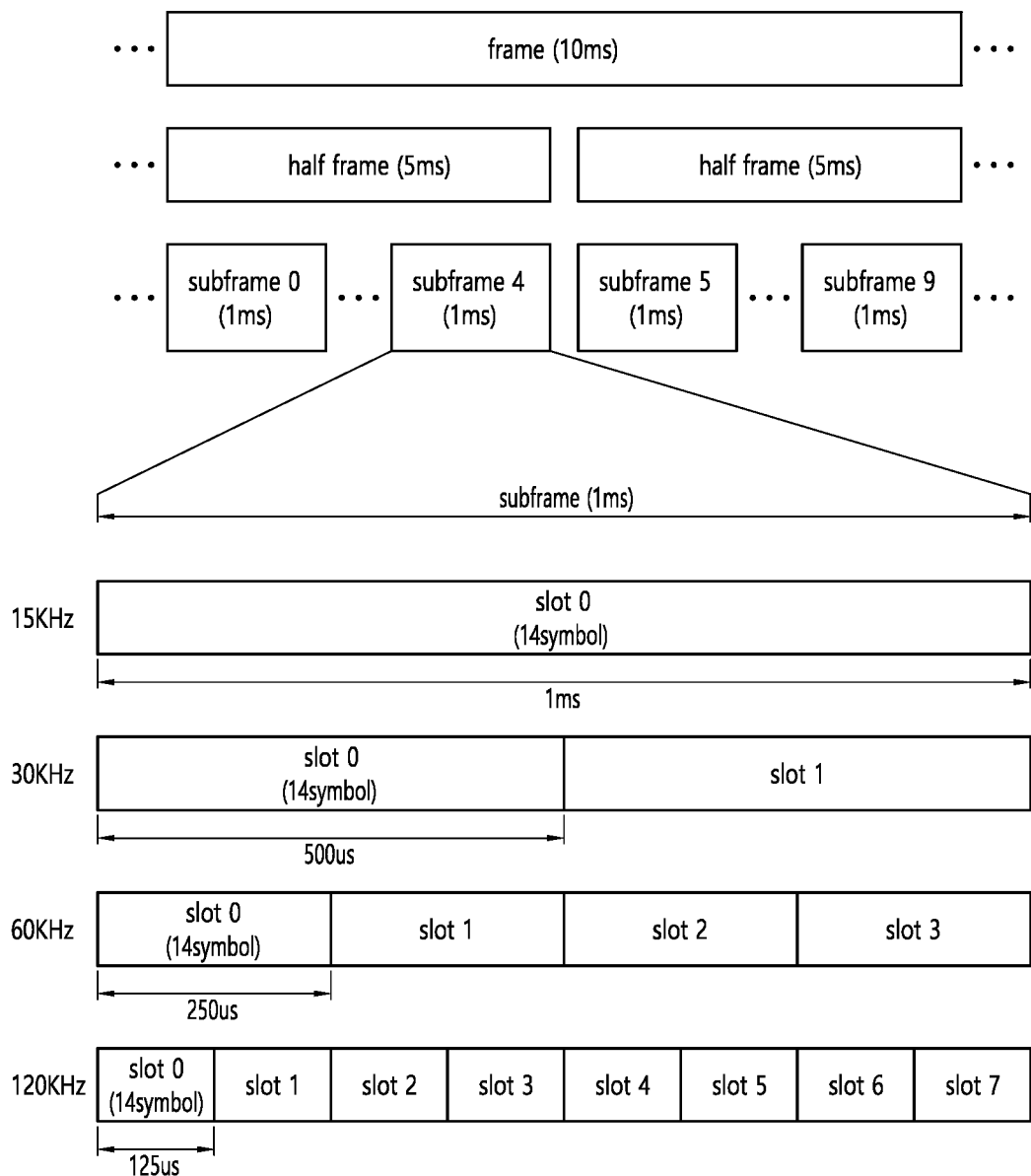
FIG. 4 illustrates structure of a radio frame used in NR.

FIG. 4 illustrates structure of a radio frame used in NR.

In NR, uplink and downlink transmission consists of frames. A radio frame has a length of 10 ms and is defined as two 5 ms half-frames (Half-Frame, HF). A half-frame is defined as 5 1 ms subframes (Subframe, SF). A subframe is divided into one or more slots, and the number of slots in a subframe depends on SCS (Subcarrier Spacing). Each slot includes 12 or 14 OFDM(A) symbols according to CP (cyclic prefix). When CP is usually used, each slot includes 14 symbols. When the extended CP is used, each slot includes 12 symbols. Here, the symbol may include an OFDM symbol (or a CP-OFDM symbol) and an SC-FDMA symbol (or a DFT-s-OFDM symbol).

Figure 5:
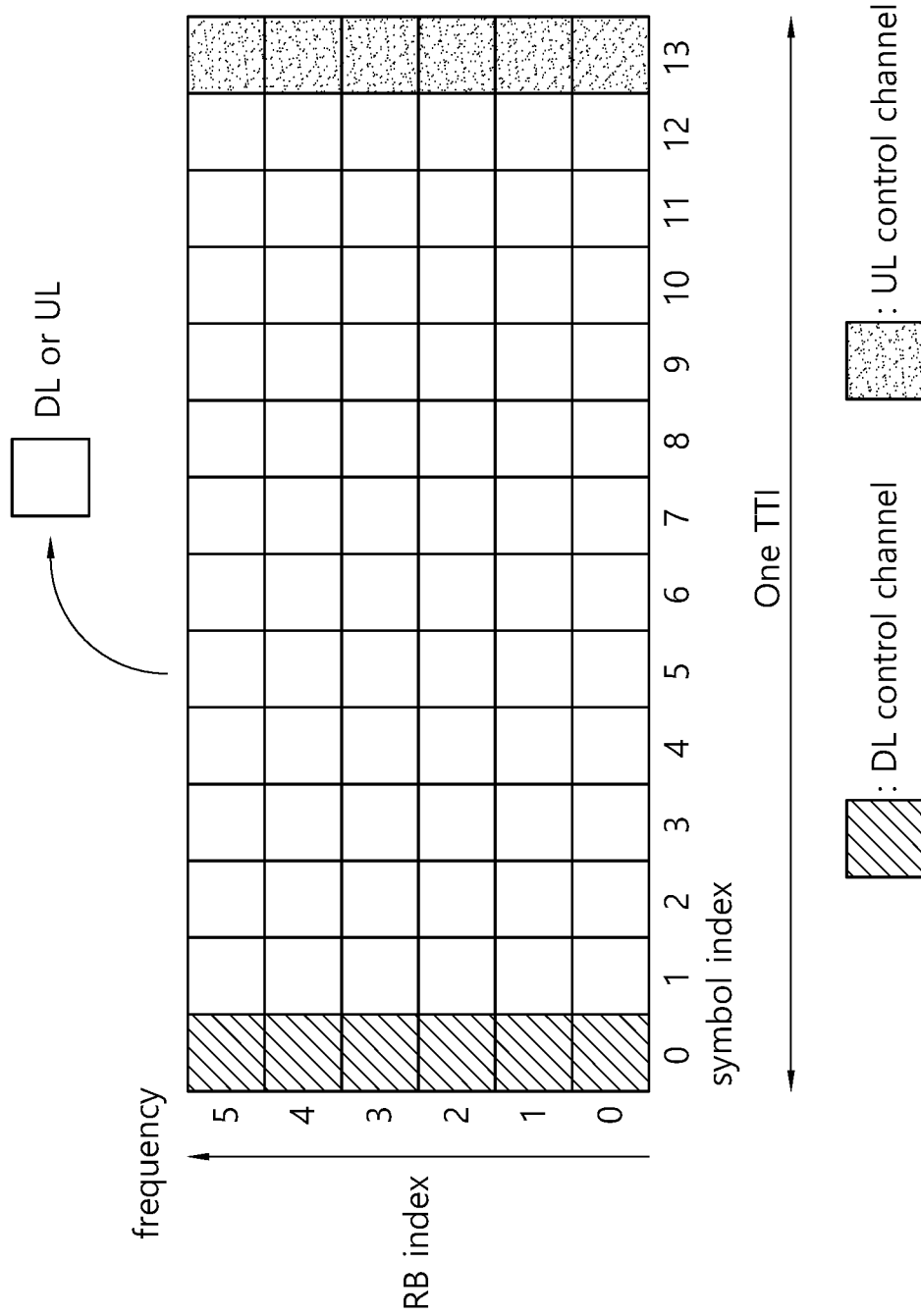
FIG. 5 shows an example of subframe types in NR.

FIG. 5 shows an example of subframe types in NR.

The TTI (transmission time interval) shown in FIG. 5 may be referred to as a subframe or a slot for NR (or new RAT). The subframe (or slot) of FIG. 5 may be used in a TDD system of NR (or new RAT) to minimize data transmission delay. As shown in FIG. 5, a subframe (or slot) includes 14 symbols, like the current subframe. The front symbol of the subframe (or slot) may be used for the DL control channel, and the rear symbol of the subframe (or slot) may be used for the UL control channel. The remaining symbols may be used for DL data transmission or UL data transmission. According to this subframe (or slot) structure, downlink transmission and uplink transmission may be sequentially performed in one subframe (or slot). Accordingly, downlink data may be received within a subframe (or slot), and uplink acknowledgment (ACK/NACK) may be transmitted within the subframe (or slot).

The structure of such a subframe (or slot) may be referred to as a self-contained subframe (or slot).

Specifically, the first N symbols in a slot may be used to transmit DL control channel (hereinafter, DL control region), and the last M symbols in a slot may be used to transmit UL control channel (hereinafter, UL control region). N and M are each an integer greater than or equal to 0. A resource region (hereinafter, referred to as a data region) between the DL control region and the UL control region may be used for DL data transmission or UL data transmission. For example, the PDCCH may be transmitted in the DL control region and the PDSCH may be transmitted in the DL data region. The PUCCH may be transmitted in the UL control region, and the PUSCH may be transmitted in the UL data region.

When the structure of such subframe (or slot) is used, the time it takes to retransmit data in which a reception error occurs is reduced, so that the final data transmission latency can be minimized. In such a self-contained subframe (or slot) structure, a time gap, from the transmission mode to the reception mode or from the reception mode to the transmission mode, may be required in a transition process. To this, some OFDM symbols when switching from DL to UL in the subframe structure may be set as a guard period (GP).

<Support of Various Numerologies>

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by μ, a subcarrier spacing and a corresponding CP length may be expressed as shown in the following table.

TABLE 3

| M | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In the case of a normal CP, when an index of a numerology is expressed by μ, the number of OLDM symbols per slot $N^{slot}_{symb}$, the number of slots per frame $N^{frame,\mu}_{slot}$, and the number of slots per subframe Nsubframe,μslot are expressed as shown in the following table.

TABLE 4

| μ | Nslotsymb | Nframe,μslot | Nsubframe,μslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by μ, the number of OLDM symbols per slot Nslotsymb, the number of slots per frame Nframe,μslot, and the number of slots per subframe Nsubframe,μslot are expressed as shown in the following table.

TABLE 5

| M | Nslotsymb | Nframe,μslot | Nsubframe,μslot |
|---|---|---|---|
| 2 | 12 | 40 | 4 |

Meanwhile, in the next-generation mobile communication, each symbol may be used for downlink or uplink, as shown in the following table. In the following table, uplink is indicated by U, and downlink is indicated by D. In the following table, X indicates a symbol that can be flexibly used for uplink or downlink.

TABLE 6

| | Symbol Number in Slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | U | U | U | U | U | U | U |
| 46 | D | D | D | D | D | X | D | D | D | D | D | D | D | X |
| 47 | D | D | D | D | X | X | D | D | D | D | D | X | X | X |
| 48 | D | D | X | X | X | X | D | D | X | X | X | X | X | X |
| 49 | D | X | X | X | X | X | X | D | X | X | X | X | X | X |
| 50 | X | U | U | U | U | U | X | U | U | U | U | U | U | U |
| 51 | X | X | U | U | U | U | X | X | U | U | U | U | U | U |
| 52 | X | X | X | U | U | U | X | X | X | U | U | U | U | U |
| 53 | X | X | X | X | U | U | X | X | X | X | U | U | U | U |
| 54 | D | D | D | D | X | U | D | D | D | D | D | X | X | U |
| 55 | D | D | X | U | U | U | D | D | X | U | U | U | U | U |
| 56 | D | X | U | U | U | U | D | X | U | U | U | U | U | U |
| 57 | D | D | D | X | X | U | D | D | D | D | D | X | X | U |
| 58 | D | D | X | X | U | U | D | D | X | X | U | U | U | U |
| 59 | D | X | X | U | U | U | D | X | X | U | U | U | U | U |
| 60 | D | X | X | X | X | U | D | X | X | X | X | X | X | U |
| 61 | D | D | X | X | X | X | U | D | D | X | X | X | X | U |

<V2X (Vehicle-to-Everything)>

V2X (vehicle-to-everything) refers to communication technology through all interfaces with the vehicle. The implementation form of V2X may be as follows.

In V2X, 'X' may mean a person (Persian) or a pedestrian (PEDESTRIAN). In this case, V2X may be displayed as V2P (vehicle-to-person or vehicle-to-pedestrian). Here, the pedestrian is not necessarily limited to a person moving on foot, and may include a person riding a bicycle, a driver or a passenger of a vehicle (below a certain speed).

Alternatively, 'X' may be an infrastructure/network. In this case, V2X may be expressed as V2I (vehicle-to-infrastructure) or V2N (vehicle-to-network), and may mean communication between a vehicle and a roadside unit (ROADSIDE UNIT: RSU) or a vehicle and a network. The roadside device may be a device that informs traffic-related infrastructure, for example, a speed. The roadside device may be implemented in a base station or a fixed terminal.

Alternatively, 'X' in V2X may be a vehicle (VEHICLE). In this case, V2X may be expressed as V2V (vehicle-to-vehicle), and may mean communication between vehicles.

A wireless device mounted on a vehicle may be referred to as a V2V device or a V2X device.

Communication between V2X devices without going through a base station is called V2X communication, and a link used for communication between V2X devices is also called sidelink.

There are the followings as physical signals used in sidelink.
  PSSCH (Physical Sidelink Shared Channel)
  PSCCH (Physical Sidelink Control Channel)
  PSDCH (Physical Sidelink Discovery Channel)
  PSBCH (Physical Sidelink Broadcast Channel)
In addition, there are the following physical signals used in sidelink.
  Demodulation Reference signal (DMRS)
  Sidelink Synchronization signal (SLSS)
The SLSS includes a primary sidelink synchronization signal (PSLSS) and a secondary sidelink synchronization signal (Secondary SLSS: SSLSS).

Figure 6:
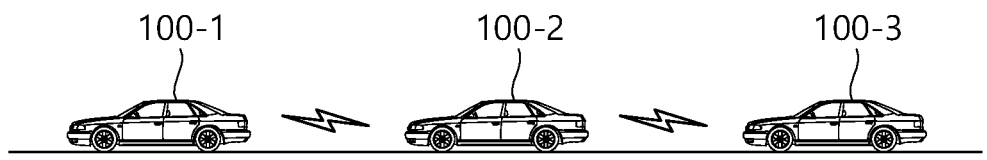
FIG. 6 is an exemplary diagram illustrating the concept of V2X.

FIG. 6 is an exemplary diagram illustrating the concept of V2X.

As can be seen with reference to FIG. 6, the wireless devices (ie, V2X devices) (100-1, 100-2, 100-3) mounted on the vehicle may communicate with each other.

Among the various implementation examples of V2X described above, looking at the implementation example of V2V communication, the vehicle is highly likely to be located in a area in the coverage of the base station or located outside the coverage of the base station.

In this way, when the V2X device is located in the region in the coverage area of the base station, or is located outside the coverage of the base station, the V2X device synchronizes time based on signal from another neighboring V2X device or signal from an artificial satellite. This will be described with reference to FIG. 7.

Figure 7:
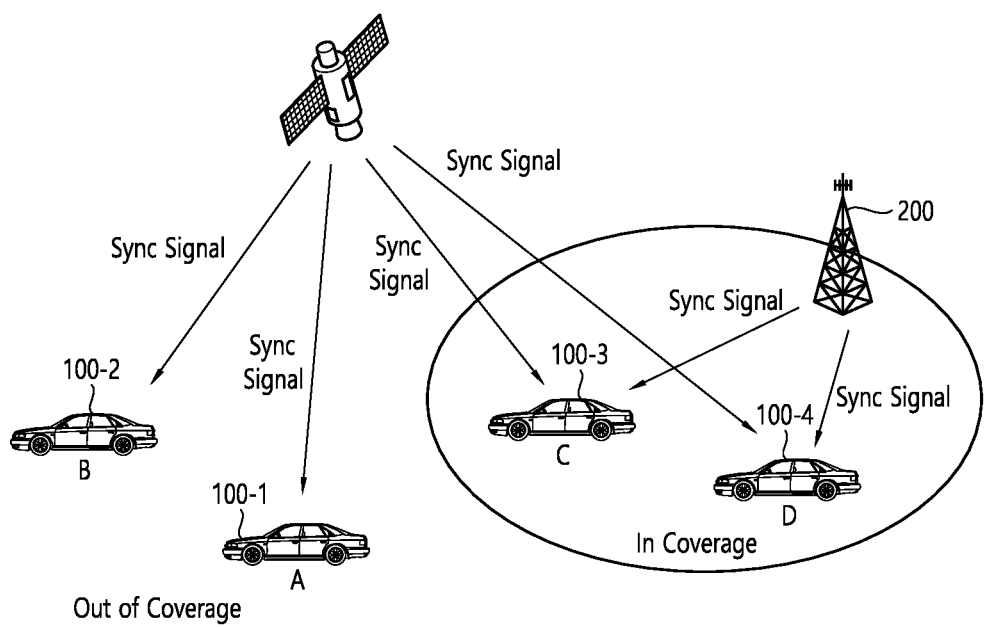
FIG. 7 is an exemplary diagram illustrating an example of using a signal from an artificial satellite as a synchronization signal for V2X communication.

FIG. 7 is an exemplary diagram illustrating an example of using a signal from an artificial satellite as a synchronization signal for V2X communication.

Referring to FIG. 7, within the coverage of the base station (In Coverage: IC), the V2X device C (100-3) and the V2X device D (100-4) exist, and out of the coverage of the base station (Out of Coverage: OoC) V2X A device A (100-1) and a V2X device B (100-2) exist. And, the V2X device A (100-1), the V2X device B (100-2), and the V2X device D (100-4) may receive signal from an artificial satellite.

Since the V2X device A (100-1) and the V2X device B (100-2) are located outside the coverage of the base station (OC), they cannot receive a synchronization signal from the base station, but can receive signal from an artificial satellite. therefore, the signal from the artificial satellite may be utilized as synchronization signal for V2X communication. The signal from the artificial satellite may be, for example, a Global Positioning System (GPS) signal or a Global Navigation Satellite System (GNSS) signal.

As such, the time synchronization reference source used for the sidelink of V2X communication may be a GNSS, a base station, and a neighboring V2X device. The priority among the plurality of time synchronization reference sources may be as follows.

TABLE 7

| priority level | GNSS-based synchronization | gNB/eNB-based synchronization |
|---|---|---|
| P0 | GNSS | gNB/eNB |
| P1 | All devices perform direct synchronization based on GNSS. | All devices perform direct synchronization based on gNB/eNB |
| P2 | All devices perform indirect synchronization based on GNSS. | All devices perform indirect synchronization based on gNB/eNB |
| P3 | Any other device or UE | GNSS |
| P4 | not available (NA) | All devices perform direct synchronization based on GNSS. |
| P5 | not available (NA) | All devices perform direct synchronization based on GNSS. |
| P6 | not available (NA) | Any other device or UE |

Whether GNSS-based synchronization or gNB/eNB-based synchronization is used may be configured in advance. In operation using one carrier (single-carrier operation), the device (or UE) obtains its transmission timing from the available synchronization criterion, which has the highest priority.

PROBLEM TO BE SOLVED THROUGH THE DISCLOSURE OF THE PRESENT SPECIFICATION

Figure 8:
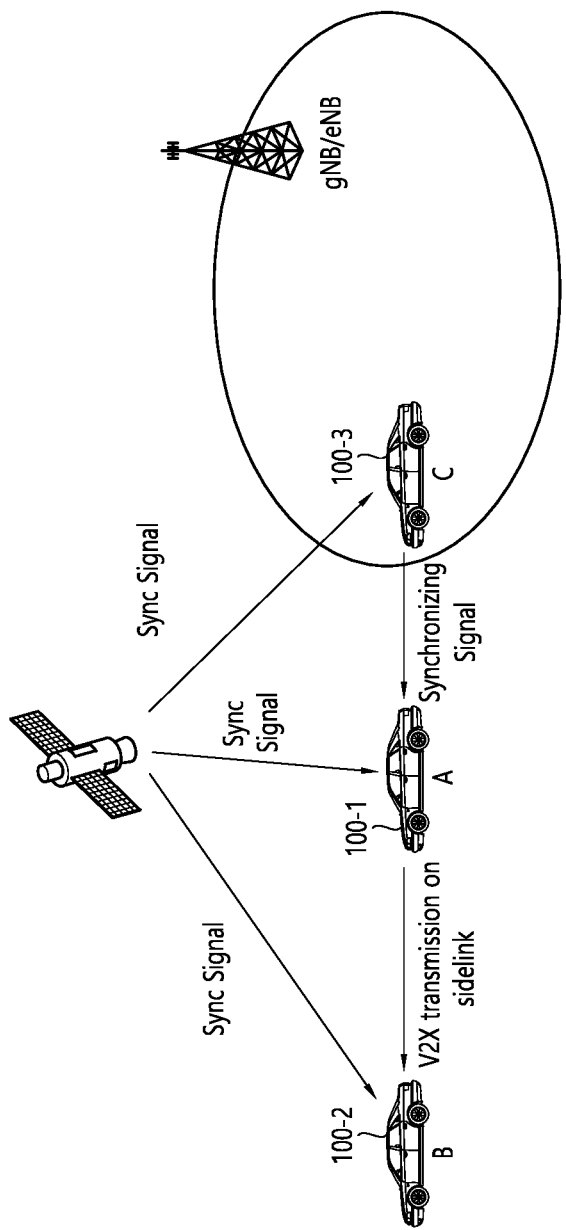
FIG. 8 is an exemplary view showing an example for the disclosure of the present specification.

FIG. 8 is an exemplary view showing an example for the disclosure of the present specification.

Referring to FIG. 8, there is V2X device C (100-3) within the coverage of the base station (In Coverage: IC), and there are V2X device A (100-1) and V2X Device B (100-2) outside the coverage of the base station (Out of Coverage: OoC).

For performing V2X communication, The V2X device C (100-3) located within the coverage (In Coverage: IC) may use time synchronization reference source that can be used to perform V2X communication. The time synchronization reference source may be a GNSS, a base station, and a neighboring V2X device.

The time synchronization reference source that can be used by the V2X device A (100-1) and the V2X device B (100-2) located outside the coverage (Out of Coverage: OoC) may be a GNSS and a neighboring V2X device.

The base station may include an eNodeB for LTE and a gNodeB for NR. The base station may include a gNodeB supporting NR and an eNodeB supporting LTE. The neighboring V2X device may include a V2X device supporting NR or a V2X device supporting LTE.

When the time synchronization reference source used for the sidelink of the V2X communication is a neighboring V2X device, the V2X device is called SyncRefUE.

Transmission on the sidelink for V2X communication is performed at $(N_{TA,SL} \ N_{TA \ offset} * Tc)$ before a time reference frame including a signal transmitted from the time synchronization reference source is received.

Here, $N_{TA \ offset}$ may be 0, and $N_{TA,SL}$ may be 0.

$T_c$ is a basic timing unit, and it may be $Tc=1/(\Delta f_{max} \ N_f)$, $\Delta f_{max}=480103$ Hz, and $N_f=4096$.

The constant $k=T_s/T_c=64$.

$T_s=1/(\Delta f_{ref} \ N_{f,ref})$, $\Delta f_{ref}=1510^3$, and $N_{f,ref}=2048$.

On the other hand, in order to guarantee the performance for V2X transmission on the NR-based sidelink, a transmit timing error needs to be technically defined. That is, when transmission is performed on the NR-based sidelink for V2X communication, a minimum timing error $(T_e)$ (hereinafter referred to as NR_V2X_$T_e$) must be defined to ensure performance.

However, there is a problem that V2X communication performance cannot be guaranteed because research on this has not been conducted until now.

DISCLOSURES OF THE PRESENT SPECIFICATION

A timing error (NR_V2X_$T_e$) for NR-based sidelink transmission for V2X communication may be defined with reference to a timing error (NR_$T_e$) for NR uplink transmission.

The below table shows the timing error (NR_$T_e$) for NR uplink transmission.

TABLE 8

| Frequency range | SCS of SSB signal (KHz) | SCS of uplink signal (KHz) | Te |
|---|---|---|---|
| FR1 | 15 | 15 | 12*64*Tc |
|  |  | 30 | 10*64*Tc |
|  |  | 60 | 10*64*Tc |

TABLE 8-continued

| Frequency range | SCS of SSB signal (KHz) | SCS of uplink signal (KHz) | Te |
|---|---|---|---|
| | 30 | 15 | 8*64*Tc |
| | | 30 | 8*64*Tc |
| | | 60 | 7*64*Tc |
| FR2 | 120 | 60 | 3.5*64*Tc |
| | | 120 | 3.5*64*Tc |
| | 240 | 60 | 3*64*Tc |
| | | 120 | 3*64*Tc |

The timing error (NR_$T_e$) for transmission performed on the NR-based uplink shown in the above table is determined based on the timing error (LTE_$T_e$) for the transmission performed on the LTE-based uplink.

On the other hand, when V2X communication is performed on the LTE-based sidelink, the timing error (LTE_V2X_$T_e$) was determined as follows.

First, when the time synchronization reference source is eNodeB, LTE_V2X_$T_e$=12 Ts was defined.

Specifically, assuming that the LTE-based downlink bandwidth (DL BW)>=3 MHz, the timing error (LTE_V2X_Te) for V2X communication on the LTE-based sidelink is defined 12 Ts, which is same as the LTE-based uplink transmission timing error (LTE_$T_e$).

LTE_V2X_$T_e$(=LTE_V2X_$T_e$_withoutMargin+margin)=LTE_$T_e$

LTE_V2X_$T_e$_withoutMargin=1/LTE_DL_NRB/2/Ts

LTE_margin=12−LTE_V2X_$T_e$_withoutMargin

TABLE 9

| LTE-based downlink bandwidth (DL BW) BWChannel [MHz] | 1.4 | 3 | 5 | 10 | 15 | 20 |
|---|---|---|---|---|---|---|
| LTE transmission bandwidth setting $N_{RB}$(=LTE_DL_NRB) | 6 | 15 | 25 | 50 | 75 | 100 |
| LTE_V2X_$T_e$ (Ts) | No define | 12 | 12 | 12 | 12 | 12 |
| LTE_V2X_$T_e$_withoutMargin(Ts) | — | 5.689 | 3.413 | 1.707 | 1.138 | 0.853 |
| LTE_margin(Ts) | — | 6.311 | 8.587 | 10.293 | 10.862 | 11.147 |

Next, when the time synchronization reference source is GNSS, LTE_V2X_$T_e$=12 Ts was defined.

Specifically, assuming GNSS BW>3 MHz, the time synchronization reference source was defined as the same value as in the case of eNodeB.

Finally, when the time synchronization reference source is SyncRefUE, LTE_V2X_$T_e$=24 Ts was defined.

Specifically, considering LTE_V2X PSBCH BW=1.08 MHz, 24 Ts same with LTE DL BW 1.4 MHz are applied. Here, 1 Ts=1/(15000*2048) second=64 Tc Similarly, in order to determine the transmission timing error for transmission on the NR-based sidelink for V2X communication, the type of time synchronization reference source may be classified and considered as followings, based on whether the V2X device is located within the network coverage (in-network coverage) or outside the network coverage (out-of network coverage) or whether it is partially located within the network coverage (partial network coverage).

First, in the case of in-network coverage, the types of available time synchronization reference sources may be gNodeB, eNodeB, and GNSS.

In this case, case in which data is received on the sidelink from the V2X device in the in-network coverage and is transmitted on the sidelink to the V2X device in the in-network coverage may be considered.

Next, in the case of out-of network coverage, the types of available time synchronization reference sources may be GNSS, SyncRefUE NR, and SyncRefUE_LTE.

In this case, case of receiving data on the sidelink from the V2X device in the out-of network coverage, and transmitting data on the sidelink to the V2X device in the out-of network coverage may be considered.

Lastly, in the case of partial network coverage, the types of available time synchronization reference sources may be SyncRefUE NR, SyncRefUE_LTE, and GNSS.

In this case, a case of receiving data on the sidelink from a V2X device in in-network coverage and transmitting data on the sidelink to a V2X device in out-of network coverage may be considered.

On the other hand, the subcarrier spacing (Subcarrier Spacing: SCS) used in the NR-based sidelink for V2X communication may be 15 kHz, 30 kHz, 60 kHz, 120 kHz.

In consideration of the above, the disclosures of the present specification provide a timing error ($T_e$) for NR-based sidelink transmission for V2X communication based on the type of time synchronization reference source and the type of numerology used for sidelink.

The first disclosure of the present specification suggests a technical minimum requirement for a transmit timing error in order to ensure the performance of the V2X communication when the time synchronization reference source used for the sidelink is GNSS.

The second disclosure of the present specification suggests a technical minimum requirement for a transmit timing error in order to ensure the performance of the V2X communication when the time synchronization reference source used for the sidelink is neighboring V2X device (or SyncRefUE).

I. The First Disclosure

The first disclosure presents a technical minimum requirement for a transmit timing error (NR_V2X_$T_e$) when the time synchronization reference source used for the sidelink is GNSS.

I-1. In Case V2X Communication is Performed on the NR-Based Sidelink Based on the Signal Reception Timing from the GNSS Channel bandwidths (CBW) of GNSS which is currently used are 15.345 MHz, 11 MHz, and 12.5 MHz. Based on this, the transmission timing error NR_V2X_$T_e$ may be basically defined as followings.

If NR_V2X_$T_e$=LTE_V2X_Te_withoutMargin+margin

LTE_V2X_$T_e$ withouMargin is based on GNSS time synchronization,

LTE_V2X_$T_e$ withoutMargin=1/GNSS CBW/2/Ts is used, it is derived as followings, and value of LTE_V2X_$T_e$ withoutMargin is assumed to be the maximum value of 1.396 Ts.

TABLE 10

| Channel Bandwidth in GNSS | LTE_V2X_$T_e$_withoutMargin (Ts) |
|---|---|
| 15.345 MHz | 1 |
| 11 MHz | 1.396 |
| 12.5 MHz | 1.229 |

The margin for the timing error (NR_V2X_$T_e$) for V2X transmission on the NR-based sidelink may be inferred from the timing error (NR_$T_e$) for transmission on the NR-based uplink and may be used.

NR_margin=NR_$T_e$-NR_$T_e$_withoutMargin

It can be obtained by using NR_$T_e$_withoutMargin=1/NR_SSB_NRB/2/Ts.

TABLE 11

| frequency range | SCS of SSB signal (KHz) | SS/PBCH (MHz) (=NR_SSB_$N_{RB}$) | SCS of sidelink signal (KHz) | NR_$T_e$ | NR_$T_e$_withoutMargin (Ts) | NR_margin (Ts) |
|---|---|---|---|---|---|---|
| FR1 | 15 | 3.6 | 15 | 12*64*Tc | 4.267 | 7.733 |
|  |  |  | 30 | 10*64*Tc |  | 5.733 |
|  |  |  | 60 | 10*64*Tc |  | 5.733 |
|  | 30 | 7.2 | 15 | 8*64*Tc | 2.133 | 5.867 |
|  |  |  | 30 | 8*64*Tc |  | 5.867 |
|  |  |  | 60 | 7*64*Tc |  | 4.867 |
| FR2 | 120 | 28.8 | 60 | 3.5*64*Tc | 0.533 | 2.967 |
|  |  |  | 120 | 3.5*64*Tc |  | 2.967 |
|  | 240 | 57.6 | 60 | 3*64*Tc | 0.266 | 2.733 |
|  |  |  | 120 | 3*64*Tc |  | 2.733 |

From NR_margin used for the timing error (NR_$T_e$) for transmission on the NR-based uplink, a margin that can be applied to the timing error (NR_V2X_$T_e$) for V2X transmission can be summarized as followings, based on the NR-based sidelink is the channel bandwidth (CBW) of GNSS and According to the NR_V2X SL SCS combination. Here, the margin for SCS of 120 kHz uses the margin for SCS of 60 kHz, in which the difference between the channel bandwidth (CBW) of GNSS and the channel bandwidth (CBW) of SSB/PBCH is the smallest.

NR_V2X SL SCS=15 kHz, 30 kHz, 60 kHz

Reuse the margin for {SCS 30 kHz of SS/PBCH, that is, NR_SSB_NRB=7.2 MHz}

NR_V2X SL SCS=120 kHz

Margin_SCS120 kHz=margin_SCS60 kHz

NR_V2X_$T_e$=LTE_V2X_$T_e$_withoutMargin+NR_margin

As the final value of the timing error (NR_V2X_$T_e$) for V2X transmission on the NR-based sidelink, ceil(LTE_V2X_Te_withoutMargin+NR_margin) or
round(LTE_V2X_Te_withoutMargin+NR_margin) or
floor(LTE_V2X_Te_withoutMargin+NR_margin)  may be applied.

Through this derivation process, in this section, an example of the final value of the timing error (NR_V2X_$T_e$) for V2X transmission on the NR-based sidelink is proposed as followings by using 'ceil(LTE_V2X_Te_withoutMargin+NR_margin)'.

TABLE 12

| SCS of sidelink signal (KHz) | LTE_V2X_Te_without Margin(Ts) | NR_margin (Ts) | NR_V2X_$T_e$ (Ts(Tc)) |
|---|---|---|---|
| 15 | 1.396 | 5.867 | 8Ts(8*64*Tc) |
| 30 |  | 5.867 | 8Ts(8*64*Tc) |
| 60 |  | 4.867 | 7Ts(7*64*Tc) |
| 120 |  | 4.867 | 7Ts(7*64*Tc) |

If simplification is required, since the difference in transmission timing error for each SCS of the NR-based sidelink is not large, an example in which 8 Ts (8*64*Tc) is applied to all SCSs is also proposed. Alternatively, considering the range error for the sidelink in FR2, the timing error (NR_V2X_$T_e$) for V2X transmission may be proposed with the following example.

TABLE 13

| SCS of sidelink signal (KHz) | NR_V2X_$T_e$ (Ts(Tc)) |
|---|---|
| 60 | (8 ± Δ)Ts((8 ± Δ)*64*Tc) |
| 120 | (8 ± Δ)Ts((8 ± Δ)*64*Tc) |

Here, Δ = 4 is proposed for the range error of the standard value.

I-2. In Case the Signal Reception Timing from GNSS is Missed, but V2X Communication on the NR-Based Sidelink is Need to Perform When the GNSS signal is weak or disappears, even before switching to time synchronization from the base station or SyncRefUE, based on the reference signal (eg, Sidelink DMRS) received from the neighboring V2X device that is transmitting/receiving The NR_V2X device can maintain the existing time synchronization. In this case, this section proposes to use the value suggested in section I-1 above for the transmission timing error. The reason is that GNSS can be assumed as a fundamental timing reference.

II. The Second Disclosure

In the second disclosure of the present specification, when the time synchronization reference source used for the sidelink is a neighboring V2X device (or SyncRefUE), in order to ensure the performance of the V2X communication, the technical minimum requirement for the transmission timing error (NR_V2X_$T_e$) is suggested.

II-1. In Case V2X Communication is Performed on the NR-Based Sidelink Based on the Signal Reception Timing from the Neighboring V2X Device (or SyncRefUE)

The timing error (NR_V2X_$T_e$) in the NR-based sidelink transmission for V2X communication bay be defined by considering additional margin and by analyzing the channel bandwidth (CBW)-based timing error of the sidelink synchronization signal (eg, S-SSB/S-PBCH) of the neighboring V2X device as below. That is, it can be obtained as the sum of $T_e$(withoutMargin) and margin.

NR_V2X_$T_e$=NR_V2X_$T_e$_withoutMargin+NR_margin,

NR_margin can be inferred from the timing error (NR_$T_e$) of NR-based uplink transmission as shown in the table below.

NR_margin=NR_$T_e$−NR_$T_e$ withoutMargin

It can be obtained by using 'NR_T$_e$ withoutMargin=1/NR_SSB_NRB/2/Ts.'

TABLE 14

| frequency range | SCS of SSB signal SCS (KHz) | SS/PBCH (MHz) (=NR_SSB_N$_{RB}$) | SCS of sidelink signal (KHz) | NR_T$_e$ | NR_T$_e$_ without Margin (Ts) | NR_ margin (Ts) |
|---|---|---|---|---|---|---|
| 1 | 15 | 3.6 | 15 | 12*64*Tc | 4.267 | 7.733 |
|   |   |   | 30 | 10*64*Tc |   | 5.733 |
|   |   |   | 60 | 10*64*Tc |   | 5.733 |
|   | 30 | 7.2 | 15 | 8*64*Tc | 2.133 | 5.867 |
|   |   |   | 30 | 8*64*Tc |   | 5.867 |
|   |   |   | 60 | 7*64*Tc |   | 4.867 |
| 2 | 120 | 28.8 | 60 | 3.5*64*Tc | 0.533 | 2.967 |
|   |   |   | 120 | 3.5*64*Tc |   | 2.967 |
|   | 240 | 57.6 | 60 | 3*64*Tc | 0.266 | 2.733 |
|   |   |   | 120 | 3*64*Tc |   | 2.733 |

NR_V2X_T$_e$_withoutMargin may be obtained by using the channel bandwidth (CBW) of the sidelink synchronization signal (eg, S-SSB/S-PBCH) of the neighboring V2X device, and may be obtained in consideration of the NR_V2X SSSB/SPBC RB.

It can be obtained using 'NR_V2X_T$_e$ withoutMargin=1/NR_V2X_SSSB_SPBCH_N$_{RB}$/2/Ts'.

From NR_margin used for timing error (NR_T$_e$) for transmission on NR-based uplink, a margin that can be applied to timing error (NR_V2X_T$_e$) for V2X transmission on NR-based sidelink can be configured as followings, based on the channel bandwidth (CBW) of the SSB/SPBCH of NR-based neighboring V2X device (NR SyncRefUE) and the combination of the SCS of the NR-based sidelink. The channel bandwidth of the SSSB/SPBCH and the channel bandwidth (CBW) of the SSB/PBCH of the below NR-based neighboring V2X device is based on the small difference in the bandwidth size between the two channels.

Selected margin=min (SyncRefUE_SSSB/SPBCH_CBW−NR_SSB/PBCH_CBW)

II-1-1. In Case of NR_V2X SSSB/SPBC RB=11 RB (A) NR_V2X SyncRefUE SSSB/SPBCH SCS=15 kHz (CBW 1.98 MHz)

In the LTE-based sidelink for V2X communication, the transmission timing error (LTE_V2X_T$_e$) is defined as 24 Ts, assuming LTE_V2X_SPBCH_CBW 1.08 MHz when the SyncRefUE time synchronization standard is used. Since LTE_V2X_SPBCH_CBW 1.08 MHz is not significantly different from the CBW (1.98 MHz) of NR_V2X SyncRefUE SSSB/SPBCH SCS 15 kHz, the margin value considered for LTE_V2X can be used.

24 Ts=LTE_V2X_Te_withoutMargin (14.222 Ts)+LTE_V2X_margin (9.778 Ts) was derived.

LTE_V2X_Te_withoutMargin=1/LTE_V2X_SPBCH_CBW/2/Ts.

LTE_V2X_margin=24−LTE_V2X_Te_withoutMargin

LTE_V2X_margin of 9.778 Ts is NR_margin and can be used based on the following criteria.

i. NR_margin_SCS_15 kHz=LTE_V2X_margin (9.778 Ts)

ii. NR_margin_SCS_30 kHz=LTE_V2X_margin−1 (=8.778 Ts)

iii. NR_margin_SCS_60 kHz=LTE_V2X_margin−2 (=7.778 Ts)

iv. NR_margin_SCS_120 kHz=LTE_V2X_margin−2 (=7.778 Ts)

(B) NR V2X SyncRefUE SSSB/SPBCH SCS=30 kHz (CBW 3.96 MHz)

NR_margin of NR DL SSB SCS 15 kHz (CBW (3.6 MHz)) can be reused. The reason is that CBW is similar.

B-1) In Case of NR V2X SL SCS=15 kHz, 30 kHz, 60 kHz

NR_margin for {SCS15 kHz of SS/PBCH, that is, NR_SSB_NRB=3.6 MHz} can be reused.

B-2) In Case of NR V2X SL SCS=120 kHz

Margin_SCS120 kHz=margin_SCS60 kHz (C) NR V2X SyncRefUE SSSB/SPBCH SCS=60 kHz (CBW 7.92 MHz)

NR_margin of NR DL SSB SCS 30 kHz (CBW (7.2 MHz)) can be reused. The reason is that CBW is similar.

C-1) In Case of NR V2X SL SCS=15 kHz, 30 kHz, 60 kHz

NR_margin for {SCS30 kHz of SS/PBCH, that is, NR_SSB_NRB=7.2 MHz} can be reused.

C-2) In Case of NR V2X SL SCS=120 kHz

Margin_SCS120 kHz=margin_SCS60 kHz (D) NR V2X SyncRefUE SSSB/SPBCH SCS=120 kHz (CBW 15.84 MHz)

Considering the NR_margin of NR DL SSB SCS 30 kHz (CBW (7.2 MHz)) NR DL

SSB SCS 120 kHz (CBW (28.8 MHz)), the following is proposed.

D-1) In Case of NR V2X SL SCS=15 kHz, 30 kHz, 60 kHz, Margin=(NR_margin for {SCS30 kHz of SS/PBCH, i.e. NR_SSB_NRB=7.2 MHz} in TableC1-1)−1

D-2) In Case of NR V2X SL SCS=120 kHz

Margin_SCS120 kHz=margin_SCS60 kHz

Therefore, NR_V2X_T$_e$ can be derived as follows.

NR_V2X_T$_e$=NR_V2X_T$_e$_withoutMargin+NR_margin

NR_V2X_T$_e$ as the final value, ceil(NR_V2X_T$_e$_withoutMargin+NR_margin) or round(NR_V2X_T$_e$_withoutMargin+NR_margin) or floor(NR_V2X_T$_e$_withoutMargin+NR_margin) may be applied.

Through this derivation process, in this section, an example of the final NR_V2X_T$_e$ value using 'ceil (NR_V2X_T$_e$_withoutMargin+NR_margin)' is proposed as follows.

TABLE 15

| SCS for SSSB/SPBCH in SyncRefUE (KHz) | NR SyncRefUE SSSB/SPBCH (MHz) (=NR_V2X_SSSB_SPBCH_NRB) | SCS of sidelink signal (KHz) | NR_V2X_T$_e$_ without Margin (Ts) | NR_ margin (Ts) | NR_V2X_T$_e$_ (Ts (Tc)) |
|---|---|---|---|---|---|
| 15 | 1.98 | 15 | 7.758 | 9.778 | 18Ts (18*64*Tc) |
|   |   | 30 |   | 8.778 | 17Ts (17*64*Tc) |
|   |   | 60 |   | 7.778 | 16Ts (16*64*Tc) |
|   |   | 120 |   | 7.778 | 16Ts (16*64*Tc) |
| 30 | 3.96 | 15 | 3.869 | 7.733 | 12Ts (12*64*Tc) |
|   |   | 30 |   | 5.733 | 10Ts (10*64*Tc) |
|   |   | 60 |   | 5.733 | 10Ts (10*64*Tc) |
|   |   | 120 |   | 5.733 | 10Ts (10*64*Tc) |
| 60 | 7.92 | 15 | 1.939 | 5.867 | 8Ts (8*64*Tc) |
|   |   | 30 |   | 5.867 | 8Ts (8*64*Tc) |
|   |   | 60 |   | 4.867 | 7Ts (7*64*Tc) |
|   |   | 120 |   | 4.867 | 7Ts (7*64*Tc) |

TABLE 15-continued

| SCS for SSSB/ SPBCH in SyncRefUE (KHz) | NR SyncRefUE SSSB/ SPBCH (MHz) (=NR_V2X_SSSB_SPBCH_NRB) | SCS of sidelink signal (KHz) | NR_V2X_ $T_e$_ without Margin (Ts) | NR_ margin (Ts) | NR_V2X_$T_e$_ (Ts (Tc)) |
|---|---|---|---|---|---|
| 120 | 15.84 | 15 | 0.970 | 4.867 | 6Ts (6*64*Tc) |
|  |  | 30 |  | 4.867 | 6Ts (6*64*Tc) |
|  |  | 60 |  | 3.867 | 5Ts (5*64*Tc) |
|  |  | 120 |  | 3.867 | 5Ts (5*64*Tc) |

If simplification is necessary, based on the above results, an example is proposed as follows (based on a large value in each SL SCS).

TABLE 16

| SCS for SSSB/SPBCH of NR SyncRefUE (KHz) | SCS of sidelink signal (KHz) | NR_V2X_$T_e$ (Ts(Tc)) |
|---|---|---|
| 15 | 15, 30, 60, 120 | 18Ts(18*64*Tc) |
| 30 | 15, 30, 60, 120 | 12Ts(12*64*Tc) |
| 60 | 15, 30, 60, 120 | 8Ts(8*64*Tc) |
| 120 | 15, 30, 60, 120 | 6Ts(6*64*Tc) |

II-1-2. In Case of NR V2X SSSB/SPBC RB=20 RB (A) In Case of NR V2X SyncRefUE SSSB/SPBCH SCS=15 kHz (CBW 3.6 MHz)

NR_margin of NR DL SSB SCS 15 kHz (CBW (3.6 MHz)) can be reused. The reason is that the CBW is the same.

A-1) In Case of NR V2X SL SCS=15 kHz, 30 kHz, 60 kHz

NR_margin for {SCS15 kHz of SS/PBCH, that is, NR_SSB_NRB=3.6 MHz} can be reused.

A-2) In Case of NR V2X SL SCS=120 kHz
Margin_SCS120 kHz=margin_SCS60 kHz (B) In Case of NR V2X SyncRefUE SSSB/SPBCH SCS=30 kHz (CBW 7.2 MHz)

NR_margin of NR DL SSB SCS 30 kHz (CBW (7.2 MHz)) can be reused. The reason is that the CBW is the same.

B-1) In Case of NR V2X SL SCS=15 kHz, 30 kHz, 60 kHz

NR_margin for {SCS30 kHz of SS/PBCH, that is, NR_SSB_NRB=7.2 MHz} may be reused.

B-2) In Case of NR V2X SL SCS=120 kHz
Margin_SCS120 kHz=margin_SCS60 kHz (C) In Case of NR V2X SyncRefUE SSSB/SPBCH SCS=60 kHz (CBW 14.4 MHz)

Considering the NR_margin of NR DL SSB SCS 30 kHz (CBW (7.2 MHz)) NR DL SSB SCS 120 kHz (CBW (28.8 MHz)), the following is proposed.

C-1) In Case of NR V2X SL SCS=15 kHz, 30 kHz, 60 kHz Margin=(NR_margin for {SCS30 kHz of SS/PBCH, i.e. NR_SSB_NRB=7.2 MHz}

C-2) In Case of NR V2X SL SCS=120 kHz
Margin_SCS120 kHz=margin_SCS60 kHz (D) In Case of NR V2X SyncRefUE SSSB/SPBCH SCS=120 kHz (CBW 28.8 MHz)

NR_margin of NR DL SSB SCS 120 kHz (CBW (28.8 MHz)) can be reused. The reason is that the CBW is the same.

D-1) In Case of NR V2X SL SCS=15 kHz, 30 kHz
Margin_SCS15 kHz=margin_SCS60 kHz+1
Margin_SCS30 kHz=margin_SCS60 kHz+1

D-2) In Case of NR V2X SL SCS=60 kHz, 120 kHz
NR_margin for {SCS1205 kHz of SS/PBCH, that is, NR_SSB_NRB=28.8 MHz} can be reused.

Therefore, the timing error (NR_V2X_Te) in the NR-based sidelink transmission for V2X communication can be derived as followings.

NR_V2X_$T_e$=NR_V2X_$T_e$_withoutMargin+NR_margin
NR_V2X_$T_e$ as the final value,
ceil(NR_V2X_$T_e$_withoutMargin+NR_margin) or
round(NR_V2X_$T_e$_withoutMargin+NR_margin) or
floor(NR_V2X_$T_e$_withoutMargin+NR_margin) may be applied.

Through this derivation process, in this section, an example of the final NR_V2X_$T_e$ value using 'ceil (NR_V2X_$T_e$_withoutMargin+NR_margin)' is proposed as followings.

TABLE 17

| SCS for SSSB/ SPBCH of NR SyncRefUE (KHz) | NR SyncRefUE SSSB/SPBCH (MHz) (=NR_V2X_SSSB_SPBCH_NRB) | SCS of sidelink signal (KHz) | NR_V2X_$T_e$_ withoutMargin (Ts) | NR_margin (Ts) | NR_V2X_$T_e$ (Ts(Tc)) |
|---|---|---|---|---|---|
| 15 | 3.6 | 15 | 4.267 | 7.733 | 12Ts(12*64*Tc) |
|  |  | 30 |  | 5.733 | 10Ts(10*64*Tc) |
|  |  | 60 |  | 5.733 | 10Ts(10*64*Tc) |
|  |  | 120 |  | 5.733 | 10Ts(10*64*Tc) |
| 30 | 7.2 | 15 | 2.133 | 5.867 | 8Ts(8*64*Tc) |
|  |  | 30 |  | 5.867 | 8Ts(8*64*Tc) |
|  |  | 60 |  | 4.867 | 7Ts(7*64*Tc) |
|  |  | 120 |  | 4.867 | 7Ts(7*64*Tc) |
| 60 | 14.4 | 15 | 1.067 | 4.867 | 6Ts(6*64*Tc) |
|  |  | 30 |  | 4.867 | 6Ts(6*64*Tc) |
|  |  | 60 |  | 3.867 | 5Ts(5*64*Tc) |
|  |  | 120 |  | 3.867 | 5Ts(5*64*Tc) |

TABLE 17-continued

| SCS for SSSB/SPBCH of NR SyncRefUE (KHz) | NR SyncRefUE SSSB/SPBCH (MHz) (=NR_V2X_SSSB_SPBCH_NRB) | SCS of sidelink signal (KHz) | NR_V2X_T$_e$_withoutMargin (Ts) | NR_margin (Ts) | NR_V2X_T$_e$ (Ts(Tc)) |
|---|---|---|---|---|---|
| 120 | 28.8 | 15 | 0.533 | 3.967 | 5Ts(5*64*Tc) |
|  |  | 30 |  | 3.967 | 5Ts(5*64*Tc) |
|  |  | 60 |  | 2.967 | 4Ts(4*64*Tc) |
|  |  | 120 |  | 2.967 | 4Ts(4*64*Tc) |

If simplification is necessary, based on the above results, an example is proposed as follows (based on a large value in each SL SCS).

TABLE 18

| SCS for SSSB/SPBCH of NR SyncRefUE (KHz) | SCS of sidelink signal (KHz) | NR_V2X_T$_e$ (Ts(Tc)) |
|---|---|---|
| 15 | 15, 30, 60, 120 | 12Ts(12*64*Tc) |
| 30 | 15, 30, 60, 120 | 8Ts(8*64*Tc) |
| 60 | 15, 30, 60, 120 | 6Ts(6*64*Tc) |
| 120 | 15, 30, 60, 120 | 5Ts(5*64*Tc) |

II-1-3. For FR2 SyncRefUE, Considering Both II-1-1 and II-1-, an Example is Proposed as Followings

TABLE 19

| SCS for SSSB/SPBCH of NR SyncRefUE (KHz) | SCS of sidelink signal (KHz) | NR_V2X_T$_e$ (Ts(Tc)) |
|---|---|---|
| 60 | 15 | (6 ± Δ)Ts((6 ± Δ)*64*Tc) |
|  | 30 | (6 ± Δ)Ts((6 ± Δ)*64*Tc) |
|  | 60 | (5 ± Δ)Ts((5 ± Δ)*64*Tc) |
|  | 120 | (5 ± Δ)Ts((5 ± Δ)*64*Tc) |
| 120 | 15 | (5 ± Δ)Ts((5 ± Δ)*64*Tc) |
|  | 30 | (5 ± Δ)Ts((5 ± Δ)*64*Tc) |
|  | 60 | (4 ± Δ)Ts((4 ± Δ)*64*Tc) |
|  | 120 | (4 ± Δ)Ts((4 ± Δ)*64*Tc) |

Here, Δ = 2 is proposed for the range error of the standard value.

II-2. In Case V2X Communication is Performed on the NR-Based Sidelink Based on the LTE Neighbor V2X Device (SyncRefUE_LTE) Reception Timing The timing error (NR_V2X_T$_e$) in the NR-based sidelink transmission for V2X communication can be defined by analyzing the timing error based on the channel bandwidth (CBW) of the sidelink synchronization signal (eg, S-SSB/S-PBCH) of the LTE neighboring V2X device as below, and the timing error can be defined by considering additional margin. That is, it can be obtained as the sum of T$_e$(withoutMargin) and margin.

NR_V2X_T$_e$=LTE_V2X_Te_withoutMargin+NR_margin,

NR_margin can be inferred from the timing error (NR_T$_e$) for NR uplink transmission as shown in the below table.

NR_margin=NR_T$_e$−NR_Te_withoutMargin

It can be obtained by using NR_T$_e$ withoutMargin=1/NR_SSB_NRB/2/Ts.

TABLE 20

| frequency range | SCS of SSB signal SCS (KHz) | SS/PBCH (MHz) (=NR_SSB_NRB) | SCS of sidelink signal (KHz) | NR_T$_e$ | NR_T$_e$_without Margin (Ts) | NR_margin (Ts) |
|---|---|---|---|---|---|---|
| FR1 | 15 | 3.6 | 15 | 12*64*Tc | 4.267 | 7.733 |
|  |  |  | 30 | 10*64*Tc |  | 5.733 |
|  |  |  | 60 | 10*64*Tc |  | 5.733 |
|  | 30 | 7.2 | 15 | 8*64*Tc | 2.133 | 5.867 |
|  |  |  | 30 | 8*64*Tc |  | 5.867 |
|  |  |  | 60 | 7*64*Tc |  | 4.867 |
| FR2 | 120 | 28.8 | 60 | 3.5*64*Tc | 0.533 | 2.967 |
|  |  |  | 120 | 3.5*64*Tc |  | 2.967 |
|  | 240 | 57.6 | 60 | 3*64*Tc | 0.266 | 2.733 |
|  |  |  | 120 | 3*64*Tc |  | 2.733 |

V2X_T$_e$ withoutMargin can be obtained by using the channel bandwidth (CBW) of the sidelink synchronization signal (eg, S-SSB/S-PBCH) of the LTE-based neighboring V2X device, and V2X_T$_e$_withoutMargin can be obtained by assuming 6 RB (1.08 MHz), which is the minimum RB that can be used for the SSSB/SPBCH of LTE-based V2X It can be obtained by using LTE_V2X_T$_e$_withoutMargin=1/LTE_V2X_SSSB_SPBCH_NRB/2/Ts.

From the NR_margin used for NR_T$_e$, the applicable margin can be configured as followings according to the combination of SSSB/SPBCH CBW and NR V2X SL SCS of an LTE-based neighboring V2X device (SyncRefUE). The channel bandwidth of the SSSB/SPBCH and the channel bandwidth of the NR SSB/PBCH of the below LTE-based neighboring V2X device (SyncRefUE) is based on a small difference in the bandwidth between the two channels.

Selected margin=min(SyncRefUE_SSSB/SPBCH_CBW−NR_SSB/PBCH_CBW)

(A) In Case of LTE_V2X SyncRefUE SSSB/SPBCH SCS=15 kHz (CBW 1.08 MHz)

The LTE_V2X timing error (LTE_V2X_Te) is defined as 24 Ts, assuming LTE_V2X_SPBCH_CBW 1.08 MHz when the SyncRefUE time synchronization standard is used.

24 Ts=LTE_V2X_Te_withoutMargin (14.222 Ts)+LTE_V2X_margin (9.778 Ts) was derived.

LTE_V2X_Te_withoutMargin=1/LTE_V2X_SPBCH_CBW/2/Ts.

LTE_V2X_margin=24−LTE_V2X_Te_withoutMargin

LTE_V2X_margin of 9.778 Ts is NR_margin and can be used based on the following criteria.

i. NR_margin_SCS_15 kHz=LTE_V2X_margin (9.778 Ts)

ii. NR_margin_SCS_30 kHz=LTE_V2X_margin−1 (=8.778 Ts)
iii. NR_margin_SCS_60 kHz=LTE_V2X_margin−2 (=7.778 Ts)
iv. NR_margin_SCS_120 kHz=LTE_V2X_margin−2 (=7.778 Ts)

Therefore, NR_V2X_$T_e$ can be derived as followings.
NR_V2X_$T_e$=LTE_V2X_Te_withoutMargin+NR_margin NR_V2X_$T_e$ as the final value,
ceil(LTE_V2X_Te_withoutMargin+NR_margin) or
round(LTE_V2X_Te_withoutMargin+NR_margin) or
floor(LTE_V2X_Te_withoutMargin+NR_margin) can be applied.

In this section, an example of the final NR_V2X_$T_e$ value using 'ceil(LTE_V2X_Te_withoutMargin+NR_margin)' is proposed through the derivation process as followings.

TABLE 21

| SCS used for SSSB/SPBCH of LTE based SyncRefUE (KHz) | LTE SyncRefUE SSSB/SPBCH (MHz) (=NR_V2X_SSSB_SPBCH_NRB) | SCS of sidelink signal (KHz) | LTE_V2X_Te_withoutMarginTs) | NR_margin (Ts) | NR_V2X_Te (Ts(Tc)) |
|---|---|---|---|---|---|
| 15 | 1.98 | 15 | 14.222 | 9.778 | (24 ± Δ)Ts((24 ± Δ)*64*Tc) |
|  |  | 30 |  | 8.778 | (23 ± Δ)Ts((23 ± Δ)*64*Tc) |
|  |  | 60 |  | 7.778 | (22 ± Δ)Ts((22 ± Δ)*64*Tc) |
|  |  | 120 |  | 7.778 | (22 ± Δ)Ts((22 ± Δ)*64*Tc) |

Here, Δ = 2 is proposed for the range error of the standard value.

If simplification is needed, since the transmission timing error difference is not large for each NR V2X SL SCS, an example of applying (24±Δ)Ts((24±Δ)*64*Tc) to all SCSs is also proposed. Here, Δ=2 is proposed for the range error of the standard value.

III. Summary of the Second Disclosure of the Present Specification

The second disclosure of the present specification is summarized as followings.

The V2X device determines to use the neighboring V2X device that is the SyncRefUE among a plurality of synchronization reference sources.

The plurality of synchronization reference sources may include a GNSS (global navigation satellite system), a NR (new radio)-based cell, an E-UTRA (an evolved-universal terrestrial radio access)-based cell, and the SyncRefUE.

Then, the V2X device performs synchronization for V2X sidelink transmission based on the neighboring V2X device that is SyncRefUE. And the V2X device performs V2X sidelink transmission based on the synchronization.

For the V2X sidelink transmission, the transmission timing error ($T_e$) should be less than or equal to the first value.

The first value is predetermined based on a subcarrier spacing (SCS) of a sidelink signal, and the subcarrier spacing (SCS) may include 15 kHz, 30 kHz, and 60 kHz.

Based on the fact that the subcarrier spacing (SCS) of the sidelink signal is 15 kHz, the first value may be a value obtained by 12*64*Tc.

Based on the fact that the subcarrier spacing (SCS) of the sidelink signal is 30 kHz, the first value may be a value obtained by 8*64*Tc.

Based on the subcarrier spacing (SCS) of the sidelink signal being 60 kHz, the first value may be a value obtained by 5*64*Tc.

The V2X sidelink transmission may be performed before receiving a signal from the SyncRefUE.

The subcarrier spacing (SCS) may further include 120 kHz.

The above-described operation may be implemented by the apparatus of FIGS. 9 to 12 to be described below.

IV. Devices in General to which the Disclosure of the Present Specification May be Applied The disclosures of the present specification described so far may be implemented through various means. For example, the disclosures of the present specification may be implemented by hardware, firmware, software, or a combination thereof. Specifically, it will be described with reference to the drawings.

Figure 9:
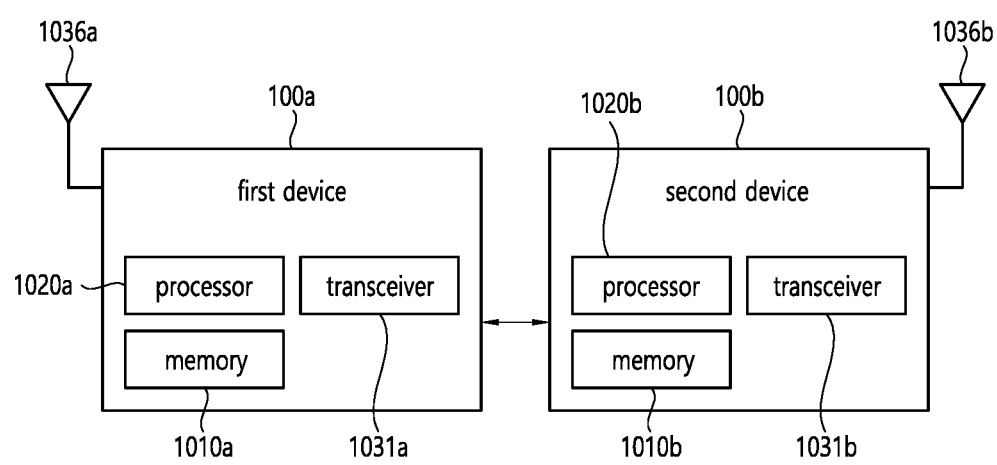
FIG. 9 shows an apparatus according to an embodiment.

FIG. 9 shows an apparatus according to an embodiment.

Referring to FIG. 9, a wireless communication system may include a first device (100a) and a second device (100b).

The first device (100a) is a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), Artificial Intelligence (AI) Module, Robot, AR (Augmented Reality) Device, VR (Virtual Reality) Device, MR (Mixed Reality) Device, Hologram Device, Public Safety Device, MTC Device, IoT Device, Medical Device, Fin tech device (or financial device), a security device, a climate/environment device, a device related to 5G services, or other devices related to the 4th industrial revolution field.

The second device (100b) is a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), Artificial Intelligence (AI) Module, Robot, AR (Augmented Reality) Device, VR (Virtual Reality) Device, MR (Mixed Reality) Device, Hologram Device, Public Safety Device, MTC Device, IoT Device, Medical Device, Fin tech device (or financial device), a security device, a climate/environment device, a device related to 5G services, or other devices related to the 4th industrial revolution field.

The first device (100a) includes at least one processor, such as a processor (1020a), and at least one memory, such as a memory (1010a), it may include at least one transceiver, such as transceiver (1031a). The processor (1020a) may perform the functions, procedures, and/or methods described above. The processor (1020a) may perform one or more protocols. For example, the processor (1020a) may perform one or more layers of an air interface protocol. The memory (1010a) is connected to the processor (1020a) and may store various types of information and/or commands. The transceiver (1031a) may be connected to the processor (1020a) and may be controlled to transmit/receive a wireless signal.

The second device (100b) may include at least one processor such as a processor (1020b), at least one memory device such as a memory (1010b), and at least one transceiver such as a transceiver (1031b). The processor (1020b) may perform the functions, procedures, and/or methods described above. The processor (1020b) may implement one or more protocols. For example, the processor (1020b) may implement one or more layers of an air interface protocol. The memory (1010b) is connected to the processor (1020b) and may store various types of information and/or commands. The transceiver (1031b) may be connected to the processor (1020b) and may be controlled to transmit/receive a wireless signal.

The memory (1010a) and/or the memory (1010b) may be respectively connected inside or outside the processor (1020a) and/or the processor (1020b), and may be connected to other processors through various technologies such as wired or wireless connection.

The first device (100a) and/or the second device (100b) may have one or more antennas. For example, antenna (1036a) and/or antenna (1036b) may be configured to transmit and receive wireless signals.

Figure 10:
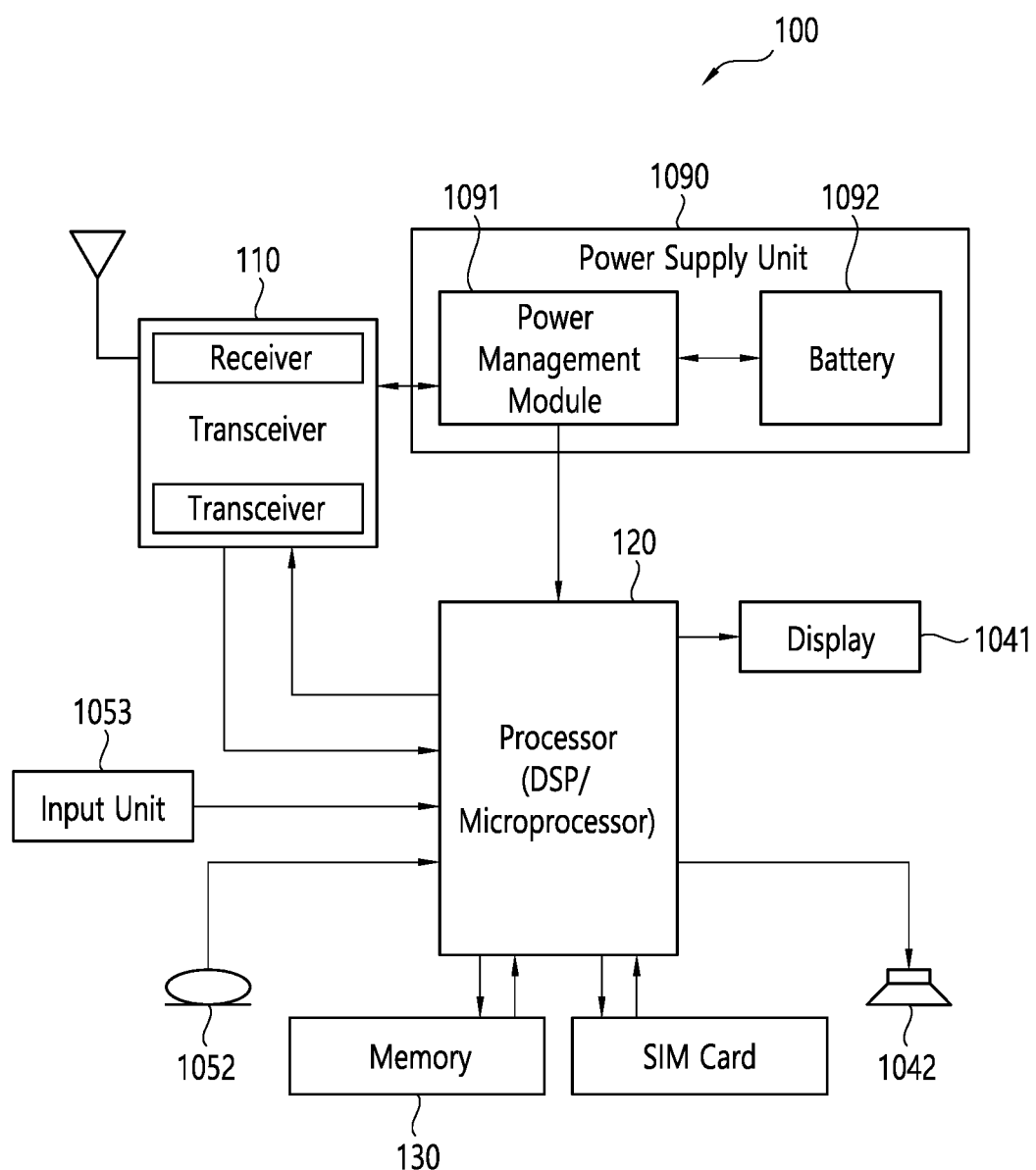
FIG. 10 is a block diagram illustrating the configuration of a terminal according to an embodiment.

FIG. 10 is a block diagram illustrating the configuration of a terminal according to an embodiment.

In particular, FIG. 10 is a diagram illustrating the apparatus of FIG. 9 in more detail above.

The device includes a memory (1010), a processor (1020), a transceiver (1031), a power management module (1091), a battery (1092), a display (1041), an input unit (1053), a speaker (1042) and a microphone (1052), SIM (subscriber identification module) card, and one or more antennas.

The processor (1020) may be configured to implement the proposed functions, procedures and/or methods described herein. The layers of the air interface protocol may be implemented in the processor (1020). The processor (1020) may include an application-specific integrated circuit (ASIC), other chipsets, logic circuits, and/or data processing devices. The processor (1020) may be an AP (application processor). The processor (1020) may include at least one of a DSP (digital signal processor), a CPU (central processing unit), a GPU (graphics processing unit), and a modem (modulator and demodulator). Examples of processor (1020) include SNAPDRAGON™ series processors manufactured by Qualcomm®, EXYNOS™ series processors manufactured by Samsung®, A series processors manufactured by Apple®, HELIO™ series processors manufactured by MediaTek®, ATOM™ series processor manufactured by INTEL® or a corresponding next-generation processor.

The power management module (1091) manages power for the processor (1020) and/or the transceiver (1031). The battery (1092) supplies power to the power management module (1091). The display (1041) outputs the result processed by the processor (1020). Input (1053) receives input to be used by processor (1020). The input unit (1053) may be displayed on the display (1041). A SIM card is an integrated circuit used to securely store an IMSI (international mobile subscriber identity) and associated keys used to identify and authenticate subscribers in mobile phone devices such as mobile phones and computers. Many SIM cards can also store contact information.

The memory (1010) is operatively coupled to the processor (1020), and stores various information for operating the processor (610). Memory (1010) may include ROM (read-only memory), RAM (random access memory), flash memory, memory cards, storage media, and/or other storage devices. When the embodiment is implemented in software, the techniques described in this specification may be implemented in modules (eg, procedures, functions, etc.) that perform the functions described in this specification. Modules may be stored in memory (1010) and executed by processor (1020). The memory (1010) may be implemented inside the processor (1020). Alternatively, the memory (1010) may be implemented outside the processor (1020), and may be communicatively connected to the processor (1020) through various means known in the art.

The transceiver (1031) is operatively coupled to the processor (1020) and transmits and/or receives a radio signal. The transceiver (1031) includes a transmitter and a receiver. The transceiver (1031) may include a baseband circuit for processing a radio frequency signal. The transceiver controls one or more antennas to transmit and/or receive radio signals. The processor (1020) transmits command information to the transceiver (1031) to transmit, for example, a radio signal constituting voice communication data to initiate communication. The antenna functions to transmit and receive radio signals. When receiving a wireless signal, the transceiver (1031) may transmit the signal for processing by the processor (1020) and convert the signal to a baseband. The processed signal may be converted into audible or readable information output through the speaker (1042).

The speaker (1042) outputs sound related results processed by the processor (1020). Microphone (1052) receives sound related input to be used by processor (1020).

The user inputs command information such as a phone number by, for example, pressing (or touching) a button of the input unit (1053) or voice activation using the microphone (1052). The processor (1020) receives such command information and processes it to perform an appropriate function, such as making a call to a phone number. Operational data may be extracted from the SIM card or the memory (1010). In addition, the processor (1020) may display command information or display information on the display (1041) for the user to recognize and for convenience.

Figure 11:
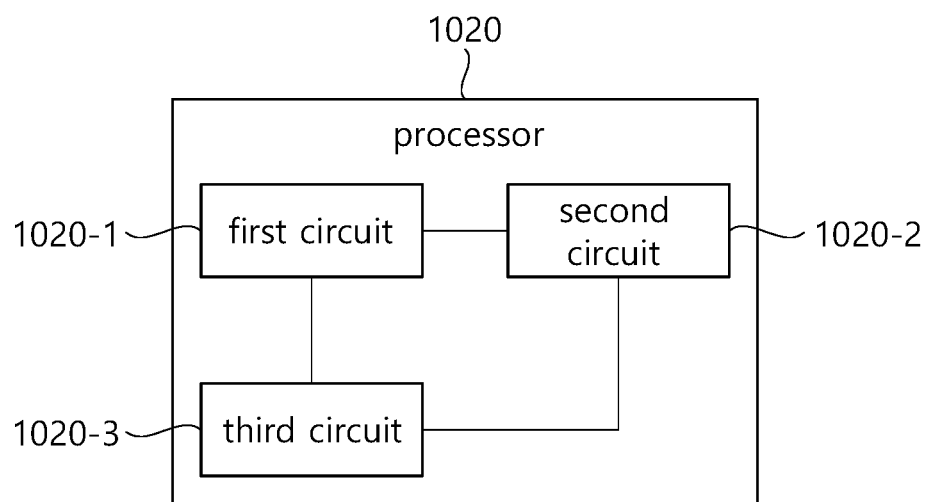
FIG. 11 shows a block diagram of a processor in which the disclosure of the present specification is implemented.

FIG. 11 shows a block diagram of a processor in which the disclosure of the present specification is implemented.

As can be seen with reference to FIG. 11, in order that the proposed functions, procedures and/or methods described in the disclosure of this specification is implemented, a processor (1020) may include a plurality of circuitry. For example, the processor (1020) may include a first circuit (1020-1), a second circuit (1020-2), and a third circuit (1020-3). Also, although not shown, the processor (1020) may include more circuits. Each circuit may include a plurality of transistors.

The processor (1020) may be referred to as an ASIC (application-specific integrated circuit) or an AP (application processor), and may include at least one of a DSP (digital signal processor), a CPU (central processing unit), and a GPU (graphics processing unit).

Figure 12:
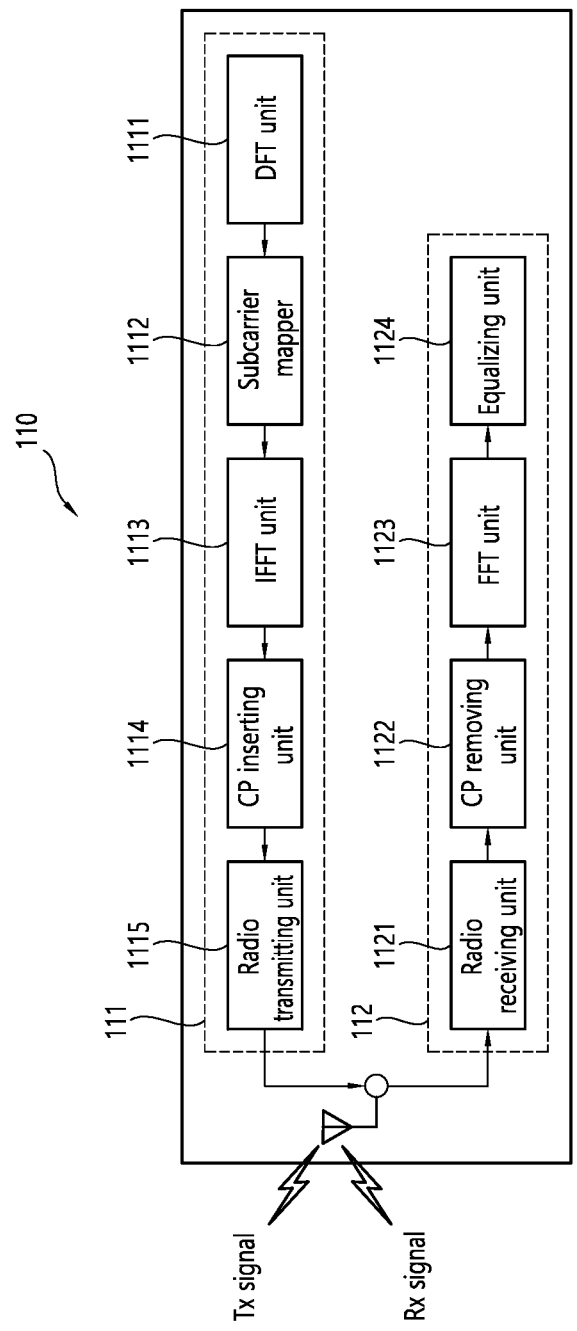
FIG. 12 is a detailed block diagram illustrating the transceiver of the first device shown in FIG. 9 or the transceiver of the device shown in FIG. 10 in detail.

FIG. 12 is a detailed block diagram illustrating the transceiver of the first device shown in FIG. 9 or the transceiver of the device shown in FIG. 10 in detail.

Referring to FIG. 12, the transceiver (1031) includes a transmitter (1031-1) and a receiver (1031-2). The transmitter (1031-1) includes a Discrete Fourier Transform (DFT) unit (1031-11), a subcarrier mapper (1031-12), an IFFT unit (1031-13) and a CP insertion unit (1031-14), and a wireless transmitter (1031-15). The transmitter (1031-1) may further include a modulator. In addition, for example, a scramble unit (not shown; scramble unit), a modulation mapper (not shown; modulation mapper), a layer mapper (not shown; layer mapper) and a layer permutator (not shown; layer permutator) may be further included, this may be disposed before the DFT unit (1031-11). That is, in order to prevent an increase in PAPR (peak-to-average power ratio), the transmitter (1031-1) passes information through the DFT (1031-11) before mapping a signal to a subcarrier. After subcarrier mapping is performed on the signal spread (or precoded in the same sense) by the DFT unit (1031-11) through the subcarrier mapper (1031-12), an IFFT (Inverse Fast Fourier Transform) unit (1031-13) to make it a signal on the time axis.

The DFT unit (1031-11) outputs complex-valued symbols by performing DFT on input symbols. For example, when Ntx symbols are input (however, Ntx is a natural number), the DFT size is Ntx. The DFT unit (1031-11) may be called a transform precoder. The subcarrier mapper (1031-12) maps the complex symbols to each subcarrier in the frequency domain. The complex symbols may be mapped to resource elements corresponding to resource blocks allocated for data transmission. The subcarrier mapper (1031-12) may be referred to as a resource element mapper. The IFFT unit (1031-13) outputs a baseband signal for data that is a time domain signal by performing IFFT on an input symbol. The CP insertion unit (1031-14) copies a part of the rear part of the base band signal for data and inserts it into the front part of the base band signal for data. ISI (Inter-symbol interference) and ICI (Inter-Carrier Interference) are prevented through CP insertion, so that orthogonality can be maintained even in a multi-path channel.

On the other hand, the receiver (1031-2) includes a radio receiver (1031-21), a CP remover (1031-22), an FFT unit (1031-23), and an equalizer (1031-24). The radio receiving unit (1031-21), the CP removing unit (1031-22), and the FFT unit (1031-23) of the receiver (1031-2) include the radio transmitting unit (1031-15) in the transmitting end (1031-1), It performs the reverse function of the CP insertion unit (1031-14) and the IFF unit (1031-13). The receiver (1031-2) may further include a demodulator.

V. Examples to which the Disclosure of the Present Specification can be Applied

Although not limited thereto, the various descriptions, functions, procedures, suggestions, methods, and/or flow charts of the disclosure of the present specification disclosed may be applied in various fields requiring wireless communication/connection (eg, 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 13:
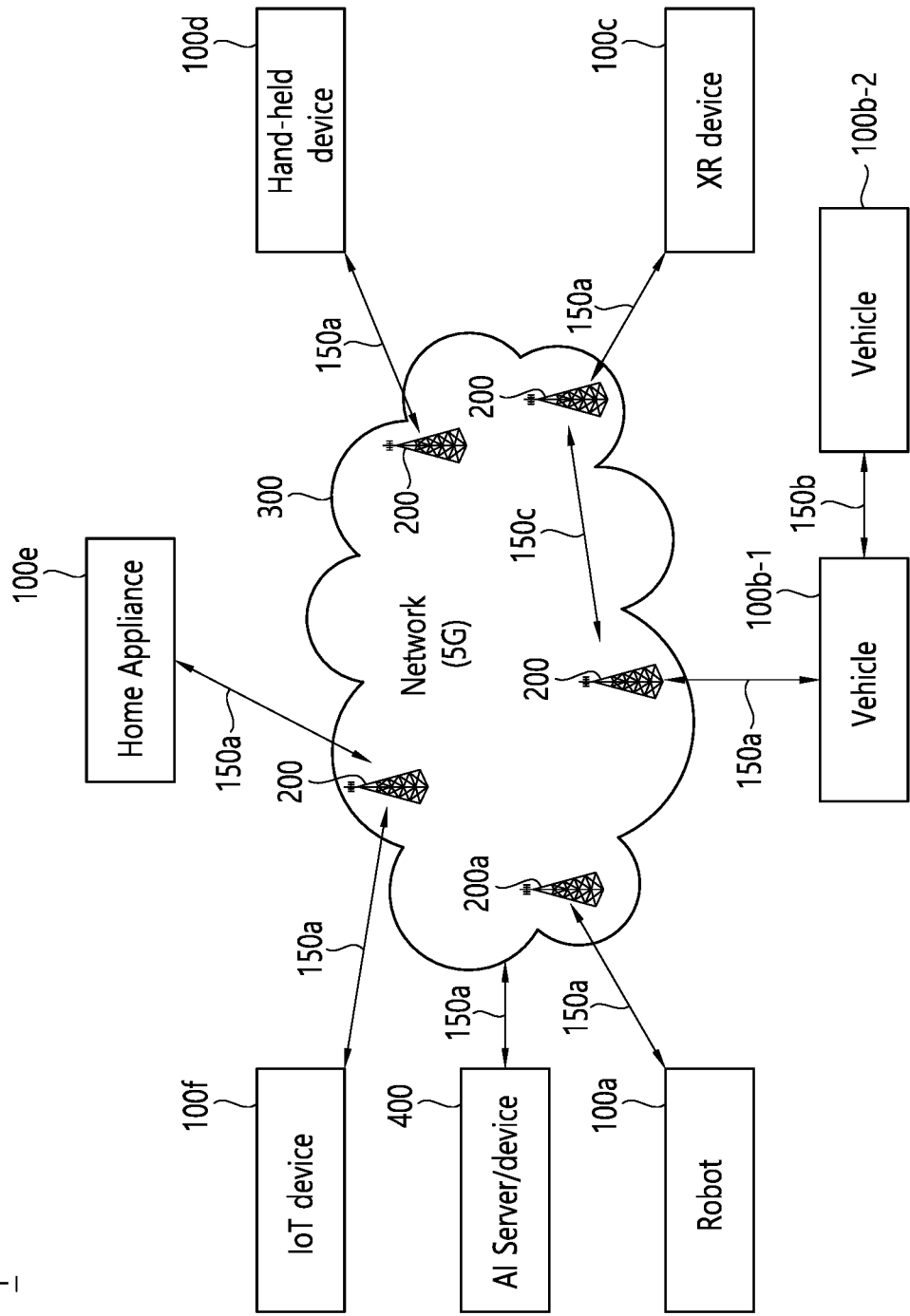
FIG. 13 illustrates a communication system 1 applied to the disclosure of the present specification.

FIG. 13 illustrates a communication system 1 applied to the disclosure of the present specification.

Referring to FIG. 13, a communication system (1) applied to the disclosure of the present specification includes a wireless device, a base station, and a network. Here, the wireless device may mean a device that performs communication using a wireless access technology (eg, 5G NR (New RAT), LTE (Long Term Evolution)), and may be referred to as a communication/wireless/5G device. Although not limited thereto, the wireless device may include a robot (100a), a vehicle (100b-1, 100b-2), an XR (eXtended Reality) device (100c), a hand-held device (100d), and a home appliance (100e), an IoT (Internet of Thing) device (100f), and an AI device/server (400). For example, the vehicle may include a vehicle equipped with a wireless communication function, an autonomous driving vehicle, a vehicle capable of performing inter-vehicle communication, and the like. Here, the vehicle may include an UAV (Unmanned Aerial Vehicle) (eg, a drone). XR devices include AR (Augmented Reality)/VR (Virtual Reality)/MR (Mixed Reality) devices, and include a HMD (Head-Mounted Device), a HUD (Head-Up Display) provided in a vehicle, a television, a smartphone, It may be implemented in the form of a computer, a wearable device, a home appliance, a digital signage, a vehicle, a robot, and the like. The portable device may include a smart phone, a smart pad, a wearable device (eg, a smart watch, smart glasses), a computer (eg, a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device (200a) may operate as a base station/network node to other wireless devices.

The wireless devices (100a-100f) may be connected to the network (300) through the base station (200). AI (Artificial Intelligence) technology may be applied to the wireless devices (100a-100f), and the wireless devices (100a-100f) may be connected to the AI server (400) through the network (300). The network (300) may be configured using a 3G network, a 4G (eg, LTE) network, or a 5G (eg, NR) network. The wireless devices (100a-100f) may communicate with each other through the base station (200)/network (300), but may also communicate directly (e.g. sidelink communication) without passing through the base station/network. For example, the vehicles (100b-1, 100b-2) may perform direct communication (e.g. Vehicle to Vehicle (V2V)/Vehicle to everything (V2X) communication). In addition, the IoT device (eg, sensor) may directly communicate with other IoT devices (eg, sensor) or other wireless devices (100a-100f).

Wireless communication/connection (150a, 150b, and 150c) may be performed between the wireless devices (100a-100f)/base station (200) and the base station (200)/base station (200). Here, the wireless communication/connection includes uplink/downlink communication (150a) and sidelink communication (150b) (or D2D communication), and communication between base stations (150c) (eg relay, IAB (Integrated Access Backhaul)). This can be done through technology (eg 5G NR) Wireless communication/connection (150a, 150b, 150c) allows the wireless device and the base station/radio device, and the base station and the base station to transmit/receive wireless signals to each other. For example, the wireless communication/connection (150a, 150b, and 150c) may transmit/receive a signal through various physical channels. To this end, based on various proposals of the present specification, At least some of various configuration information setting process for transmission/reception of a wireless signal (eg, channel encoding/decoding, modulation/demodulation, resource mapping/demapping, etc.), resource allocation process and etc may be performed.

In the above, preferred embodiments have been exemplarily described, but the disclosure of the present specification is not limited to such specific embodiments, and thus, modifications, changes, or can be improved.

In the exemplary system described above, the methods are described on the basis of a flowchart as a series of steps or blocks, but are not limited to the order of the steps described, some steps may occur in a different order or concurrent with other steps as described above. have. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A method for a vehicle to everything (V2X) sidelink communication, the method performed by a V2X device and comprising:
    performing a synchronization for a V2X sidelink transmission based on a synchronization reference user equipment (SyncRefUE); and
    performing the V2X sidelink transmission based on the synchronization,
    wherein for the V2X sidelink transmission, a transmission timing error (Te) is to be less than or equal to a first value,
    wherein the first value is predetermined based on a subcarrier spacing (SCS) of a sidelink signal which includes 15 kHz, 30 kHz and 60 kHz,
    wherein based on that the SCS of the sidelink signal is 60 kHz, the first value is a value obtained from $5*64*Tc$, and
    wherein the Tc is a basic time unit.

2. The method of claim 1,
    wherein based on that the SCS of the sidelink signal is 15 kHz, the first value is a value obtained from $12*64*Tc$.

3. The method of claim 1,
    wherein based on that the SCS of the sidelink signal is 30 kHz, the first value is a value obtained from $8*64*Tc$.

4. The method of claim 1, wherein the V2X sidelink transmission is performed before receiving a signal from the SyncRefUE.

5. The method of claim 1, further comprising:
    determining to use the SyncRefUE for the synchronization, among a plurality of synchronization reference sources,
    wherein the plurality of synchronization reference sources include a global navigation satellite system (GNSS), a new radio (NR) based cell, an evolved-universal terrestrial radio access (E-UTRA) based cell and a SyncRefUE.

6. The method of claim 5, wherein the first value for the transmission timing error (Te) is predetermined based on the plurality of synchronization reference sources.

7. The method of claim 1,
    wherein the SCS further includes 120 kHz.

8. A V2X (vehicle to everything) device for V2X sidelink, the device comprising:
    at least one processor; and
    at least one memory for storing instructions and operably electrically connectable with the at least one processor, based on the instructions being operated by the at least one processor, performed operation comprising:
    performing a synchronization for a V2X sidelink transmission based on a synchronization reference user equipment (SyncRefUE); and
    performing the V2X sidelink transmission based on the synchronization,
    wherein for the V2X sidelink transmission, a transmission timing error (Te) is to be less than or equal to a first value,
    wherein the first value is predetermined based on a subcarrier spacing (SCS) of a sidelink signal which includes 15 kHz, 30 kHz and 60 kHz,
    wherein based on that the SCS of the sidelink signal is 60 kHz, the first value is a value obtained from $5*64*Tc$, and
    wherein the Tc is a basic time unit.

9. The device of claim 8,
    wherein based on that the SCS of the sidelink signal is 15 kHz, the first value is a value obtained from $12*64*Tc$.

10. The device of claim 8,
    wherein based on that the SCS of the sidelink signal is 30 kHz, the first value is a value obtained from $8*64*Tc$.

11. The device of claim 8, wherein the V2X sidelink transmission is performed before receiving a signal from the SyncRefUE.

12. The device of claim 8, further comprising:
    determining to use the SyncRefUE for the synchronization, among a plurality of synchronization reference sources,
    wherein the plurality of synchronization reference sources include a global navigation satellite system (GNSS), a new radio (NR) based cell, an evolved-universal terrestrial radio access (E-UTRA) based cell and a SyncRefUE.

13. The device of claim 8,
    wherein the SCS further includes 120 kHz.

14. A processor equipped in a V2X (vehicle to everything) device for V2X sidelink communication comprising:
    first circuit for performing synchronization for V2X sidelink transmission, based on a synchronization reference user equipment (SyncRefUE); and
    second circuit for performing V2X sidelink transmission, based on the synchronization;
    wherein for the V2X sidelink transmission, a transmission timing error (Te) is to be less than or equal to a first value,
    wherein the first value is predetermined based on a subcarrier spacing (SCS) of a sidelink signal which includes 15 kHz, 30 kHz and 60 kHz,
    wherein based on that the SCS of the sidelink signal is 60 kHz, the first value is a value obtained from $5*64*Tc$, and
    wherein the Tc is a basic time unit.

15. The processor of claim 14,
    wherein the SCS further includes 120 kHz.

* * * * *